US012593358B2

(12) United States Patent
Zhou et al.

(10) Patent No.: US 12,593,358 B2
(45) Date of Patent: Mar. 31, 2026

(54) METHOD AND APPARATUS FOR DETERMINING SIDELINK RESOURCE

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 18/010,609

(22) PCT Filed: Jun. 17, 2021

(86) PCT No.: PCT/KR2021/007609
§ 371 (c)(1),
(2) Date: Dec. 15, 2022

(87) PCT Pub. No.: WO2021/256872
PCT Pub. Date: Dec. 23, 2021

(65) Prior Publication Data
US 2023/0262765 A1    Aug. 17, 2023

(30) Foreign Application Priority Data

Jun. 17, 2020   (CN) ......................... 202010562442.0
Aug. 5, 2020    (CN) ......................... 202010779568.3
(Continued)

(51) Int. Cl.
*H04W 74/08*       (2024.01)
*H04W 74/0816*     (2024.01)

(52) U.S. Cl.
CPC ... *H04W 74/0816* (2013.01); *H04W 74/0866* (2013.01)

(58) Field of Classification Search
CPC ................................................. H04W 74/0816
See application file for complete search history.

(56) References Cited

U.S. PATENT DOCUMENTS

2019/0075548 A1    3/2019   Lee et al.
2019/0132818 A1    5/2019   Yasukawa et al.
(Continued)

FOREIGN PATENT DOCUMENTS

CN        111246426 A      6/2020
EP          4192050 A1 *   6/2023    ........ H04W 74/0808
(Continued)

OTHER PUBLICATIONS

Samsung, 'On Resource Allocation for NR V2X Mode 2', R1-1910471, 3GPP TSG RAN WG1 #98bis, Chongqing, China, Oct. 8, 2019.
(Continued)

*Primary Examiner* — Pamit Kaur
(74) *Attorney, Agent, or Firm* — Jefferson IP Law, LLP

(57) ABSTRACT

A method and a terminal for determining a sidelink resource are disclosed. The method includes: determining a first sensing window, performing channel sensing in the first sensing window, and determining, in a transmission window, a sidelink resource for transmitting a sidelink transmission according to a result of the channel sensing, wherein the transmission window is used for transmitting the sidelink transmission. The disclosure determines a range of channel sensing, so that the power consumption of a UE monitoring a sidelink is reduced.

10 Claims, 9 Drawing Sheets

```
┌─────────────────────────────────────────────────┐
│                                                 │
│        Determine a sensing window               │~─S510
│                                                 │
└─────────────────────────────────────────────────┘
                        │
                        ▼
┌─────────────────────────────────────────────────┐
│                                                 │
│   Proform channel sensing in the sensing window │~─S520
│                                                 │
└─────────────────────────────────────────────────┘
                        │
                        ▼
┌─────────────────────────────────────────────────┐
│  Determine, in a transmission window, a sidelink resource for transmitting │
│   a sidelink transmission according to a result of the channel sensing     │~─S530
└─────────────────────────────────────────────────┘
```

(30)        Foreign Application Priority Data

| | | |
|---|---|---|
| Feb. 1, 2021 | (CN) | ......................... 202110139715.5 |
| Apr. 2, 2021 | (CN) | ......................... 202110363859.9 |

(56)              References Cited

U.S. PATENT DOCUMENTS

| | | | |
|---|---|---|---|
| 2019/0306835 A1* | 10/2019 | Hoang | .................. H04W 72/53 |
| 2019/0313405 A1 | 10/2019 | Li et al. | |
| 2020/0029245 A1 | 1/2020 | Khoryaev et al. | |
| 2020/0314803 A1 | 10/2020 | Zhang et al. | |

FOREIGN PATENT DOCUMENTS

| | | |
|---|---|---|
| KR | 10-2019-0039078 A | 4/2019 |
| WO | 2018/030825 A1 | 2/2018 |

OTHER PUBLICATIONS

Nokia et al., 'Discussion of Resource Allocation for Sidelink—

Mode 2', R1-1910514, 3GPP TSG RAN WG1 #98bis, Chongqing, China, Oct. 8, 2019.

Caict, 'Considerations on the resource allocation for NR sidelink Mode2', R1-1911323, 3GPP TSG RAN WG1 #98bis, Chongqing, China, Oct. 7, 2019.

European Search Report dated Nov. 8, 2023, issued in European Application No. 21826658.3.

LG Electronics; Discussion on resource allocation for Mode 2; 3GPP TSG RAN WG1 Meeting #100; R1-2000783; e-Meeting; Feb. 24-Mar. 6, 2020; Feb. 17, 2020.

Intel Corporation; Remaining details of partial sensing for P2V communication; 3GPP TSG RAN WG1 Meeting #88; R1-1702141; Athens, Greece; Feb. 13-17, 2017; Feb. 7, 2017.

Chinese Office Action with English translation dated May 16, 2025; Chinese Appln. No. 202110363859.9.

Chinese Office Action with English translation dated Sep. 23, 2025; Chinese Appln. No. 202110363859.9.

Chinese Office Action dated Jan. 14, 2026, issued in Chinese Patent Application No. 202110363859.9.

* cited by examiner

FIG. 2B

METHOD AND APPARATUS FOR DETERMINING SIDELINK RESOURCE

TECHNICAL FIELD

The disclosure relates to the technical field of wireless communication, and more particularly, to a method for transmitting sidelink (SL) data and corresponding sidelink feedback messages in sidelink communication in the fifth generation new radio (5G NR) access technology systems.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the Long Term Evolution (LTE) technology, sidelink communication mainly includes two types of mechanisms including direct Device to Device (D2D) communication and vehicle to vehicle/infrastructure/pedestrian/network (collectively referred to as V2X) communication, where the V2X communication is designed based on the D2D technology, is superior to the D2D in data rate, delay, reliability and link capacity, and is the most representative sidelink communication technology in LTE technology. In 5G systems, sidelink communication mainly includes V2X communication currently.

DISCLOSURE OF INVENTION

Technical Problem

An objective of the disclosure is to provide a method for transmitting sidelink (SL) data and corresponding sidelink feedback messages in a sidelink communication system.

Solution to Problem

Embodiments of the disclosure provide a method for determining a sidelink resource, including: determining a first sensing window; performing channel sensing in the first sensing window; and determining, in a transmission window, a sidelink resource for transmitting a sidelink transmission according to a result of the channel sensing, where the transmission window is used for transmitting the sidelink transmission.

In some implementations, the method further includes determining a plurality of second sensing windows, where the determined first sensing window includes an intersection or a union of the plurality of second sensing windows.

In some implementations, determining the first sensing window further includes determining a set of second sensing windows corresponding to at least one resource in the transmission window; and determining the first sensing window as a union of sets of second sensing windows corresponding to all resources in the transmission window.

In some implementations, if the at least one resource in the transmission window corresponds to a plurality of second sensing windows, the set of second sensing windows includes an intersection or union of the plurality of second sensing windows, and if the at least one resource in the transmission window corresponds to one second sensing window, the set of second sensing windows includes one second sensing window.

In some implementations, the method further includes determining a sensing window which includes the first sensing window and/or the second sensing window by using at least one of the following methods: determining the sensing window by determining an offset between a start position and/or an end position of the sensing window and a start position and/or an end position of the transmission window; determining the sensing window by determining an offset between the start position and/or the end position of the sensing window and at least one resource in the transmission window; determining the sensing window by determining an offset between the start position and the end position of the sensing window; determining the sensing window by determining the start position and/or the end position of the sensing window according to the start position and/or the end position of the transmission window or a position of the at least one resource in the transmission window, and the offset between the start position and/or the end position of the sensing window and the start position and/or the end position of the transmission window or the at least one resource in the transmission window; determining the sensing window by determining one of the start position and/or the end position of the sensing window according to the offset between the start position and the end position of the sensing window, and another one of the start position and/or the end position of the sensing window; determining the sensing window by determining the start position and/or end position of the sensing window which is configured or defined; determining the sensing window by determining the start position and/or the end position of the sensing window which is periodic.

In some implementations, the method further includes selecting a method for determining the sensing window according to at least one of the following: a configuration; a user equipment (UE) capability; and priorities of different methods.

In some implementations, the method further includes determining a sensing window which includes the first sensing window and/or the second sensing window by the following method: determining a resource range; and further determining the sensing window as a part of the sensing window within the resource range.

In some implementations, the method further includes determining the sensing window by the following method: if multiple parts of the sensing window are included in the resource range, further determining the sensing window as a latest part, or latest multiple parts, or all parts among the multiple parts.

In some implementations, the method further includes determining a sensing window according to at least one set of configuration parameters, where the at least one set of configuration parameters includes one or more of the following configuration parameters: a processing time delay, including a time delay for processing the result of the channel sensing and determining the sidelink resource according to the result of the channel sensing; an offset between a sidelink resource indicated in sidelink control information (SCI) and the SCI; a period of the sidelink resource indicated in the SCI; a maximum value of the offset between the sidelink resource indicated in the SCI and the SCI; an index used for determining the sensing window; a user equipment (UE) identity; a UE group identity; a UE intra-group identity; geographic location information; a start resource and an end resource of the transmission window; a period parameter for determining the sensing window; an offset parameter for determining the sensing window; and at least one other configuration parameter for adjusting the sensing window, where the sensing window includes the first sensing window and/or the second sensing window and/or a set of the second sensing windows.

In some implementations, the configuration parameters are defined or configured, or determined according to at least one of: a service priority, a cast type, a service target identity, a Channel Busy Ratio (CBR), a resource pool, a V2X carrier, a logical channel identifier (LCID), a hybrid automatic repeat request (HARQ) process, and a sidelink grant.

In some implementations, determining the plurality of second sensing windows includes determining each second sensing window according to at least one set of configuration parameters respectively, where sets of configuration parameters corresponding to different second sensing windows are the same or different.

In some implementations, the method further includes determining a plurality of resource ranges, where determining the plurality of resource ranges includes determining each resource range according to at least one set of configuration parameters respectively, where sets of configuration parameters corresponding to different resource ranges are the same or different.

In some implementations, determining the sidelink resource for transmitting the sidelink transmission includes at least one of: excluding a sidelink resource in the transmission window which has been reserved; retaining a specific resource in the transmission window; excluding other sidelink resources except for a specific resource in the transmission window; using a result of channel sensing from other user equipments (UEs) received in the sensing window or on other sidelink resources as the result of the channel sensing; using a sidelink resource scheduled by other UEs for a UE which is received in the sensing window or on other sidelink resources as the sidelink resource for transmitting the sidelink transmission; and selecting the sidelink resource for transmitting the sidelink transmission from remaining sidelink resources in the transmission window.

In some implementations, the method further includes: receiving, by the UE, a sidelink resource indicated in SCI and/or higher layer signaling, and/or a result of channel sensing from other UEs, and/or a sidelink resource scheduled by the other UEs for the UE in the first sensing window; and determining a type of the sidelink resource, and/or determining that the indicated information is the result of the channel sensing from the other UEs, and/or determining that the indicated information is the sidelink resource scheduled by the other UEs for the UE.

In some implementations, the type of the sidelink resource includes the sidelink resource being a reserved sidelink resource or a specific resource, and/or the sidelink resource being a resource reserved by a transmitter UE of the SCI for its subsequent transmission, or a resource determined by the transmitter UE of the SCI and/or the higher layer signaling which has been reserved by itself and/or other sidelink UEs, or a resource available for other UEs which is determined by the transmitter UE of the SCI and/or the higher layer signaling.

In some implementations, determining the type of the sidelink resource, and/or determining that the indicated information is the result of the channel sensing from the other UEs, and/or determining that the indicated information is the sidelink resource scheduled by the other UEs for the UE, by the UE according to at least one of: determining according to whether the signaling is a specific signaling; determining according to a resource on which the signaling is received; determining according to an identity of the transmitter UE of the signaling; and determining according to specific other parameters.

In some implementations, the method further includes: after receiving the sidelink resource indicated in the SCI and/or the higher layer signaling, determining validity of the indication; and selecting the sidelink resource for transmitting the sidelink transmission according to the indication if the indication is valid, and not selecting the sidelink resource for transmitting the sidelink transmission according to the indication if the indication is invalid.

In some implementations, if sidelink resources indicated in SCIs and/or higher layer signalings from more than one transmitter UE are received, and/or if sidelink resources indicated in more than one sidelink transmission are received, including at least one of: selecting a specific sidelink resource for transmitting the sidelink transmission based on information indicated in the SCIs and/or the higher layer signalings from all of the more than one transmitter UE and/or in all of the more than one sidelink transmission; selecting one or more transmitter UEs from the more than one transmitter UE, and/or selecting one or more transmissions of the more than one sidelink transmission, and selecting a specific sidelink resource for transmitting the sidelink transmission according to information indicated in SCI and/or a higher layer signaling from the one or more transmitter UEs and/or in the one or more sidelink transmissions.

In some implementations, determining the validity of the indication, and/or selecting one or more of the more than one transmitter UE, and/or selecting one or more transmissions of the more than one sidelink transmission includes determining and/or selecting according to at least one of: geographic location information, a UE group identity and/or a UE intra-group identity, a transmission time, content indicated in the SCI and/or higher signaling or in the sidelink transmission.

Embodiments of the disclosure provide a terminal for determining a sidelink resource, including: a transceiver for transmitting and receiving signals; a processor; and a memory storing instructions executable by the processor that, when executed by the processor, cause the processor to perform the aforementioned methods.

The disclosure provides a method for channel sensing on partial resources in a sidelink resource pool. The method does not take the premise that a UE always keeps monitoring the sidelink resources in the prior art, but determines a channel sensing range, thereby reducing the power consumption of the UE monitoring the sidelink.

BRIEF DESCRIPTION OF DRAWINGS

In order to explain the technical solution of embodiments of the disclosure more clearly, the drawings of the embodiments will be briefly introduced below, and apparently, the drawings in the following description only relate to some embodiments of the disclosure, but do not limit the disclosure. In the drawings:

FIGS. 2A and 2B illustrate example wireless transmit and receive paths according to various embodiments of the disclosure;

MODE FOR THE INVENTION

Figure 1:
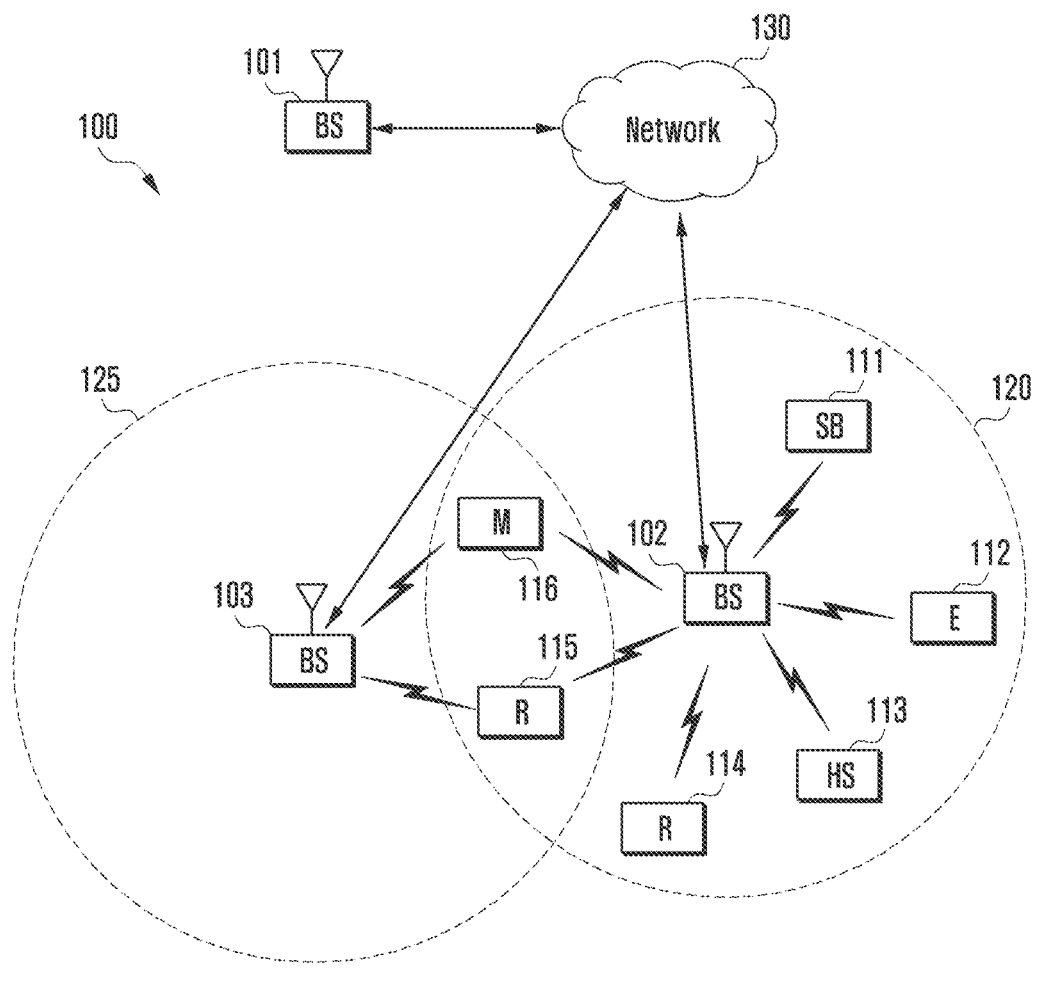
FIG. 1 illustrates a schematic diagram of an example wireless network according to various embodiments of the disclosure.

The following description with reference to the accompanying drawings is provided to assist in a comprehensive understanding of various embodiments of the disclosure as defined by the claims and their equivalents. The following description includes various specific details to assist understanding, but these are merely example. Accordingly, those skilled in the art will recognize that various changes and modifications may be made to the various embodiments described herein without departing from the scope of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Therefore, it will be apparent to those skilled in the art that the following descriptions of the various embodiments of the disclosure are provided for illustrative purposes only and are not intended to limit the disclosure as defined by the appended claims and their equivalents.

Unless otherwise defined, the technical or scientific terms used in the disclosure shall have the ordinary meanings understood by those having ordinary skills in the field to which the disclosure belongs. The terms "first", "second", and the like used in this disclosure do not indicate any order, quantity, or importance, but are only used to distinguish different components. Similarly, "a", "an", or "the" and the like do not indicate a limit on quantity, but rather indicate that there is at least one. Words such as "including" or "comprising" mean that the element or item appearing before the word encompasses the element or item appearing after the word and the equivalent thereof without excluding other elements or items. Words such as "connected" or "interconnected" are not limited to physical or mechanical connections, but may include electrical connections, whether direct or indirect. "Upper", "lower", "left", "right", etc. are only used to indicate the relative positional relationship, and in a case where the absolute position of the object to be described is changed, the relative positional relationship may also be changed accordingly.

The advantages and features of one or more embodiments of the disclosure and implementation methods thereof can be more easily understood by referring to the following detailed description of the embodiments and the accompanying drawings. In this regard, the embodiment may have different forms and should not be construed as being limited to the descriptions set forth herein. Rather, these embodiments are provided so that this disclosure will be thorough and complete, and will fully convey the concept of the embodiments to those skilled in the art, and the scope of protection of this disclosure will be limited only by the appended claims.

Here, it will be understood that a flowchart or a combination of blocks in a process flowchart may be executed by computer program instructions. These computer program instructions can be loaded into a processor of a general purpose computer, special purpose computer, or another programmable data processing device, so the instructions executed by a computer or a processor of another programmable data processing device are created for execution unit of functions described in flowchart block(s). Computer program instructions may be stored in a computer-usable or computer-readable memory capable of directing a computer or another programmable data processing device to perform a function in a particular manner, and therefore, instructions stored in the computer-usable or computer-readable memory can also produce manufacturing items that contain instruction units for performing the functions described in the flowchart block. Computer program instructions may also be loaded into a computer or another programmable data processing device, and therefore, in a case where a series of operations are performed in the computer or the other programmable data processing device, instructions of the computer or the other programmable data processing device operated by generating a process performed by the computer can provide operations for performing the functions described in the flowchart block.

In addition, each block may represent module, segment, or portion of code, where the module, segment, or code includes one or more executable instructions for performing specified logical function(s). It should also be noted that in some alternative implementations, the functions mentioned in the block may not appear in order. For example, two blocks shown in sequence may in fact be executed concurrently, or the blocks may sometimes be executed in a reverse order according to corresponding functions.

The term "unit" in an embodiment of the disclosure means a software component or a hardware component (such as a field programmable gate array (FPGA) or an application specific integrated circuit (ASIC)) that performs a specific function. However, the term "unit" is not limited to software or hardware. A "unit" may be formed to be in an addressable storage medium or may be formed to operate one or more processors. Thus, for example, the term "unit" may refer to components such as software components, object-oriented software components, class components, and task components, and may include procedures, functions, properties, programs, subroutines, program code segments, drivers, firmware, microcode, circuits, data, databases, data structures, tables, arrays, or variables. The functions provided by components and "units" can be associated with fewer components and "units", or can be divided into additional components and "units". In addition, components and "units" may be embodied as reproducing one or more central processing units (Central Processing Units, CPUs) in a device or a secure multimedia card. Furthermore, in embodiments, a "unit" may include at least one processor.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification. Hereinafter, for example, the base station may be at least one of a gNode B, an eNode B, a Node B, a radio access unit, a base station controller, and a node on a network. The terminal may include a user equipment (UE), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments of the disclosure may be applied to 5G wireless communication technologies (5G, new radio (NR)) developed after LTE-A, or to new wireless communication technologies proposed on the basis of 4G or 5G (for example, B5G (super 5G) or 6G).

Hereinafter, one or more embodiments of the disclosure will be described with reference to the accompanying drawings.

FIG. 1 illustrates an example wireless network according to various embodiments of the disclosure. The embodiment of the wireless network shown in FIG. 1 is for illustration only. Other embodiments of the wireless network 100 can be used without departing from the scope of this disclosure.

The wireless network includes a gNodeB (gNB) 101, a gNB 102, and a gNB 103. The gNB 101 communicates with the gNB 102 and the gNB 103. The gNB 101 also communicates with at least one Internet Protocol (IP) 130, such as the Internet, a proprietary IP network, or other data network.

Depending on the network type, other well-known terms such as "base station" or "access point" can be used instead of "gNodeB" or "gNB." For the sake of convenience, the terms "gNodeB" and "gNB" are used in this patent document to refer to network infrastructure components that provide wireless access to remote terminals. Also, depending on the network type, other well-known terms such as "mobile station," "subscriber station," "remote terminal," "wireless terminal," or "user device" can be used instead of the term "user equipment" or "UE". For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, WiFi, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As will be described in more detail below, one or more of the gNB 101, the gNB 102, and the gNB 103 includes a 2D antenna array as described in embodiments of the disclosure. In some embodiments, one or more of gNB 101, gNB 102, and gNB 103 supports codebook design and structure for a system with a 2D antenna array.

Although FIG. 1 illustrates one example of a wireless network, various changes may be made to FIG. 1. For example, the wireless network can include any number of gNBs and any number of UEs in any suitable arrangement.

Also, the gNB 101 can communicate directly with any number of UEs and provide those UEs with wireless broadband access to the network 130. Similarly, each of the gNBs 102-103 can communicate directly with the network 130 and provide UEs with direct wireless broadband access to the network 130. Further, the gNBs 101, 102, and/or 103 can provide access to other or additional external networks, such as external telephone networks or other types of data networks.

Figure 2A:
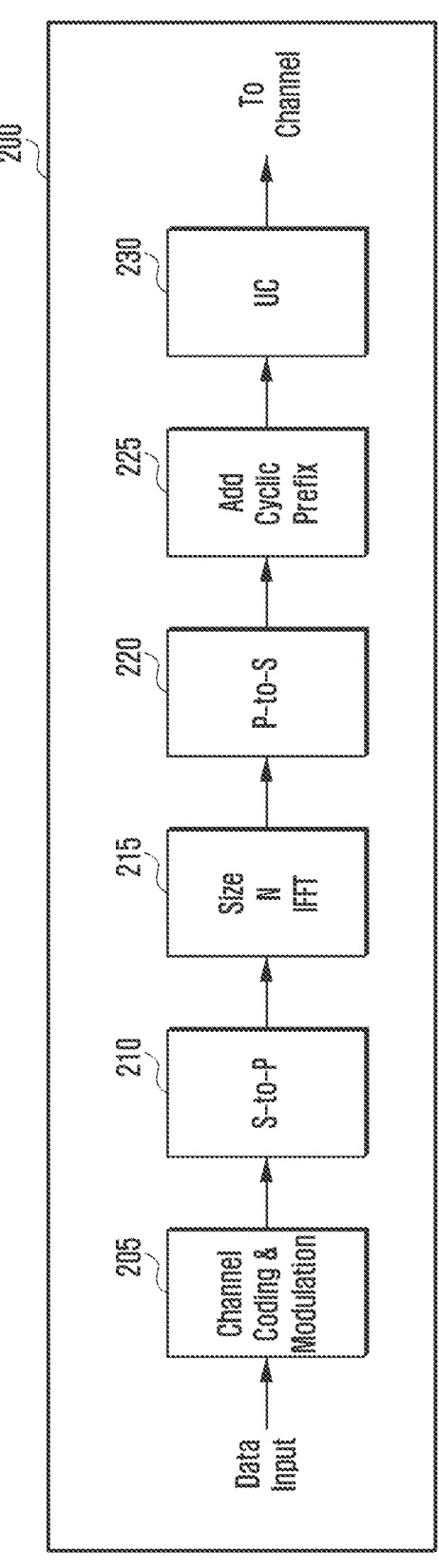
Figure 2B:
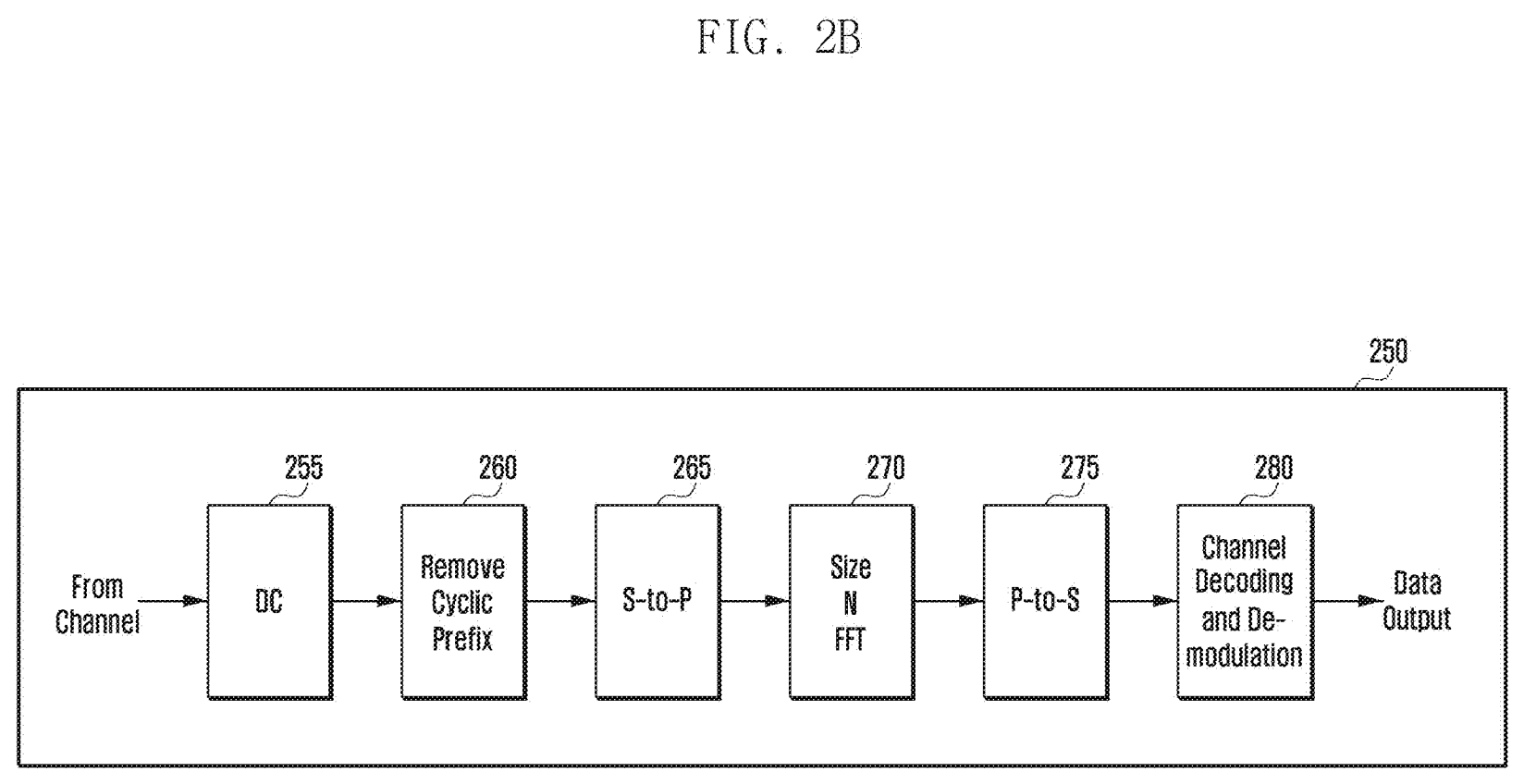

FIGS. 2A and 2B illustrate example wireless transmit and receive paths according to various embodiments of the disclosure. In the following description, a transmit path 200 can be described as being implemented in a gNB, such as the gNB 102, and a receive path 250 can be described as being implemented in a UE, such as the UE 116. However, it should be understood that the receive path 250 can be implemented in a gNB and the transmit path 200 can be implemented in a UE. In some embodiments, the receive path 250 is configured to support codebook design and structure for a system with a 2D antenna array as described in embodiments of the disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path circuitry 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding) and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (i.e., demultiplexes) the serial modulated symbols to parallel data to generate N parallel symbol streams where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 to generate a serial time-domain signal. The add cyclic prefix block 225 inserts a cyclic prefix to the time-domain signal. The up-converter 230 modulates (such as up-converts) the output of the add cyclic prefix block 225 to RF frequency for transmission via a wireless channel. The signal may also be filtered at baseband before conversion to RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time-domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of 2 (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
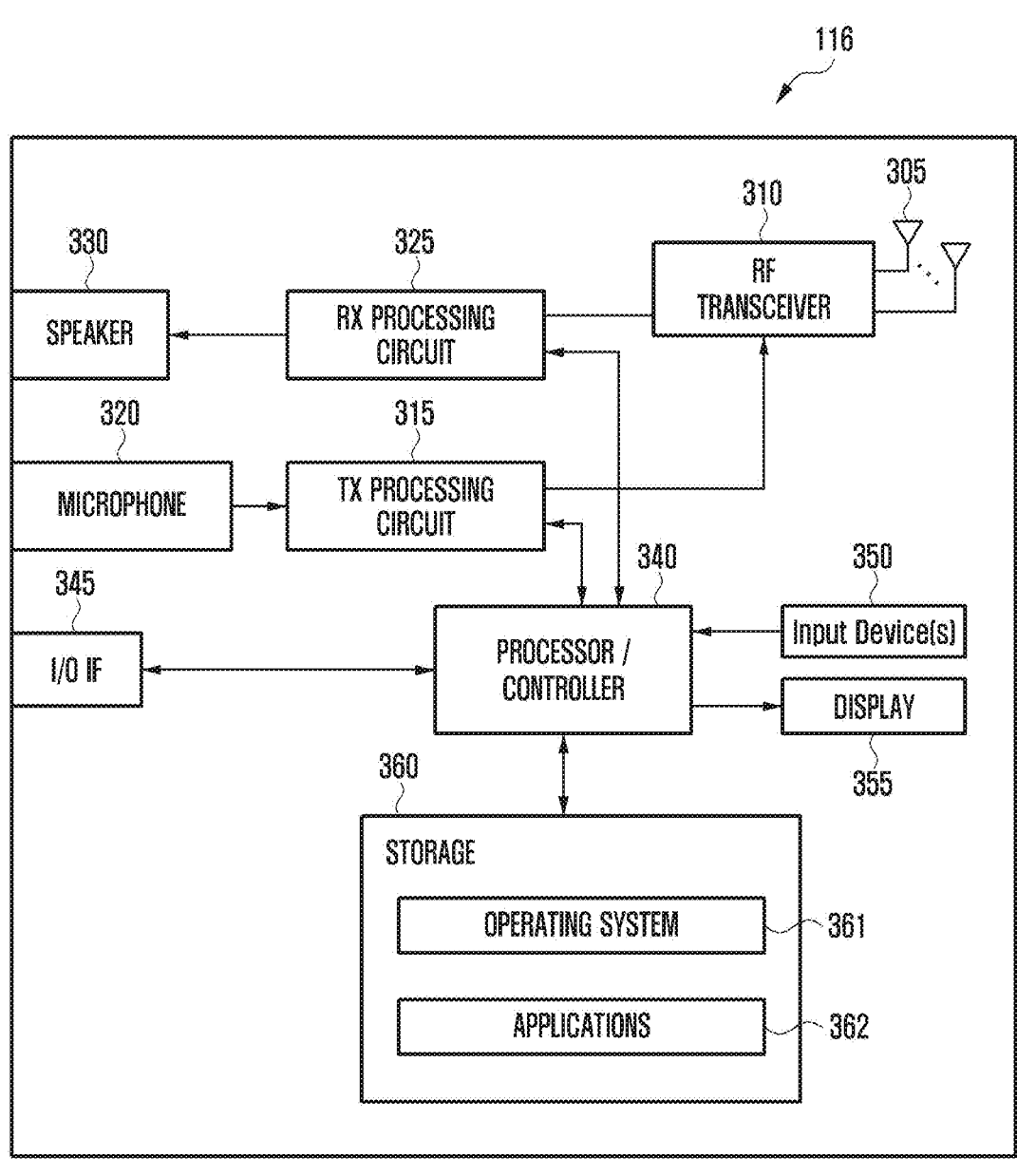
FIG. 3A illustrates an example user equipment (UE) according to various embodiments of the disclosure.

FIG. 3A illustrates an example UE 116 according to various embodiments of the disclosure. The embodiment of the UE 116 illustrated in FIG. 3A is for illustration only, and the UEs 111-115 of FIG. 3A can have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and a receive (RX) processing circuitry 325. The UE 116 also includes a speaker 330, a processor/controller 340, an input/output (I/O) interface (IF) 345, an input device 350, a display 355, and a memory 360. The memory 360 includes a basic operating system (OS) program 361 and one or more applications 362.

The RF transceiver 310 receives, from the antenna 305, an incoming RF signal transmitted by a gNB of the wireless network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the basic OS 361 stored in the memory 360 in order to control the overall operation of the UE 116. For example, the processor/controller 340 can control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or micro-controller.

The processor/controller 340 is also capable of executing other processes and programs resident in the memory 360, such as operations for channel quality measurement and reporting for a system having a 2D antenna array as described in embodiments of the disclosure. The processor/controller 340 can move data into or out of the memory 360 as required by an executing process. In some embodiments, the processor/controller 340 is configured to execute the applications 362 based on the OS 361 or in response to a signal received from a gNB or an operator. The processor/controller 340 is also coupled to the I/O interface 345, which provides the UE 116 with the ability to connect to other devices such as a laptop computer and a handheld computer. The I/O interface 345 is the communication path between these accessories and the processor/controller 340.

The processor/controller 340 is also coupled to an input device(s) 350 and a display 355. The operator of the UE 116 can use the input device(s) 350 to enter data into the UE 116. The display 355 may be a liquid crystal display or other display capable of rendering text and/or at least limited graphics, such as from web sites. The memory 360 is coupled to the processor/controller 340. Portion of the memory 360 can include a random access memory (RAM), and another portion of the memory 360 can include a Flash memory or other read-only memory (ROM).

Although FIG. 3A illustrates one example of UE 116, various changes may be made to FIG. 3A. For example, various components in FIG. 3A can be combined, further subdivided, or omitted and additional components can be added according to particular needs. As a particular example, the processor/controller 340 can be divided into multiple processors, such as one or more central processing units (CPUs) and one or more graphics processing units (GPUS). Also, while FIG. 3A illustrates the UE 116 configured as a mobile telephone or smartphone, UEs can be configured to operate as other types of mobile or stationary devices.

Figure 3B:
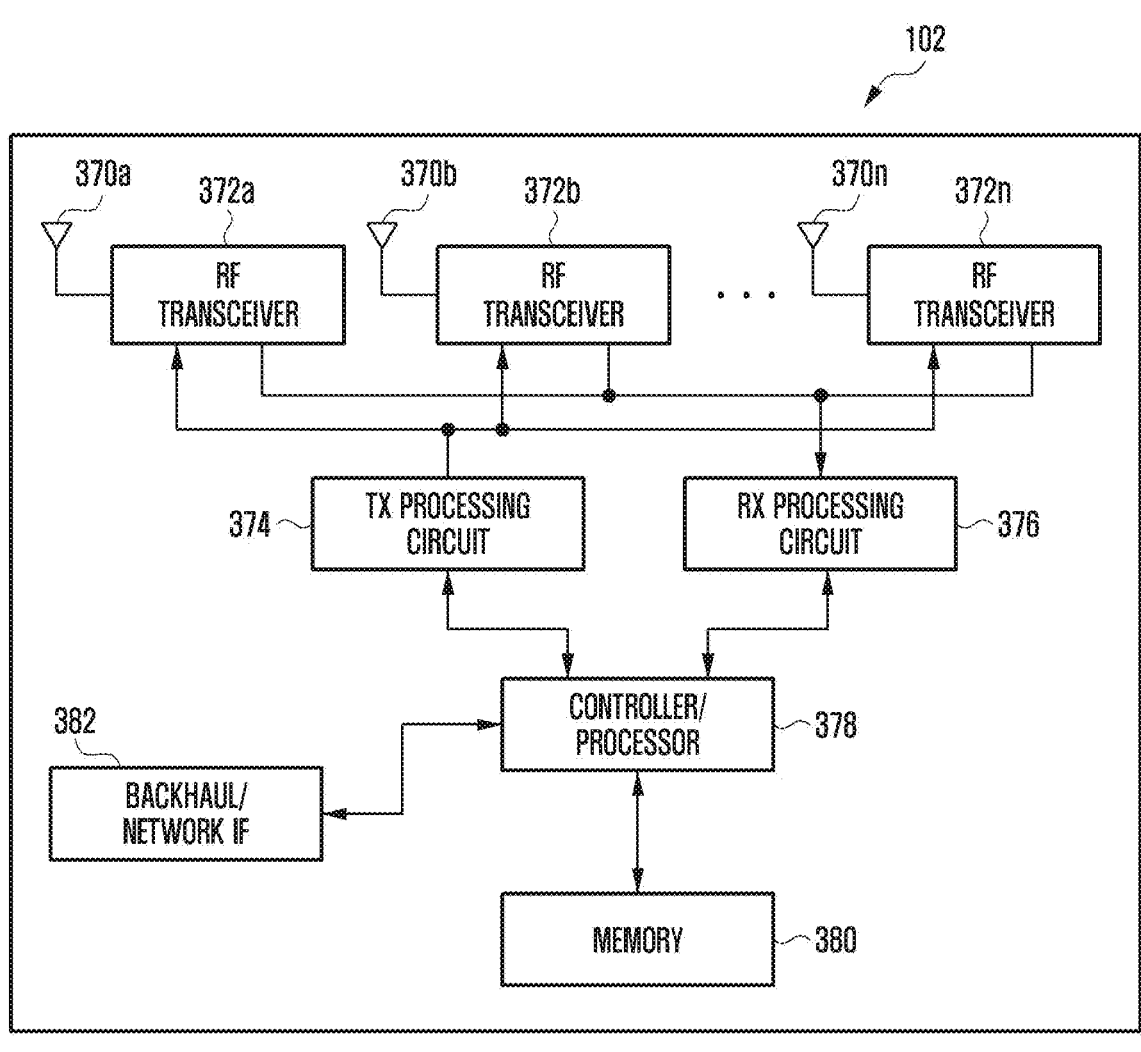
FIG. 3B illustrates an example gNB according to various embodiments of the disclosure.

FIG. 3B illustrates an example gNB 102 according to various embodiments of the disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of this disclosure to any particular implementation of a gNB. It is noted that gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are transmitted to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by an interfering signal. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for a system having a 2D antenna array as described in embodiments of the disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as portion of a cellular communication system (such as one supporting 5G, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Portion of the memory 380 can include a RAM, and another portion of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of a gNB 102, various changes may be made to FIG. 3B. For example, the gNB 102 may include any number of each component shown in FIG. 3. As a particular example, an access point may include a number of interfaces 382, and the controller/processor 378 may support routing functions to route data between different network addresses. As another particular example, while shown as including a single instance of TX processing circuitry 374 and a single instance of RX processing circuitry 376, the gNB 102 may include multiple instances of each (such as one per RF transceiver).

There are several sidelink physical channels defined in NR V2X systems, including a Physical Sidelink Control Channel (PSCCH), a Physical Sidelink Shared Channel (PSSCH) and a Physical Side Link Feedback Channel (PSFCH). The PSSCH is used to carry data, the PSCCH is used to carry sidelink control information (SCI) indicating information such as time-frequency domain resource location, modulation and coding scheme, or a receiving target ID targeted by the PSSCH, and the PSFCH is used to carry HARQ-ACK information corresponding to the data.

In NR V2X system, at present, a slot in 5G systems is used as the minimum unit of resource allocation in time domain, and a sub-channel is defined as the minimum unit of resource allocation in frequency domain. A sub-channel is configured as several RBs in frequency domain, and the sub-channel may include resources corresponding to at least one of PSCCH, PSSCH and PSFCH.

From the perspective of resource allocation, the 5G side-link communication system includes two modes: the resource allocation mode based on the scheduling of a base station and the resource allocation mode autonomously selected by a UE. In 5G V2X systems, the resource allocation mode based on the scheduling of a base station and resource allocation mode autonomously selected by a UE are referred to as mode 1 and mode 2, respectively.

For mode 1, the method for a base station to schedule resources for a sidelink UE is to transmit a sidelink grant to the sidelink UE, and indicate several or periodic sidelink resources for the sidelink UE in the sidelink grant. The sidelink grant includes a dynamic grant and a configured grant, in which the dynamic grant is indicated by DCI, and the configured grant further includes a type 1 configured grant and a type 2 configured grant. The type 1 configured grant is indicated by RRC signaling and the type 2 configured grant is activated/deactivated by the DCI.

For mode 2, the method for a sidelink UE to select resources autonomously is that the UE always keeps monitoring and buffering a sidelink resource pool, and before a sidelink transmission needs to be transmitted, determines a channel sensing time window and a resource selection time window according to the expected time range for transmitting the sidelink transmission, performs channel sensing within the channel sensing time window, excludes the side-link resources reserved by other sidelink UE within the resource selection time window according to the result of the channel sensing, and randomly selects sidelink resources not excluded within the resource selection time window for sidelink transmission.

In the prior art, a UE performs channel sensing based on its buffered sidelink transmission received on all resources in the sidelink resource pool. However, the premise of this method is that the UE has the requirement of receiving the sidelink service, and is not sure when it will receive the sidelink transmission transmitted to it, so it needs to continuously monitor every slot in the sidelink resource pool, and receive and buffer all possible sidelink transmissions. The UE will not skip any monitoring on a sidelink slot (except for the case that it cannot be monitored due to the limitation of a UE capability such as half duplex/receiving downlink transmission, which does not belong to the scope of skipping monitoring), resulting in a large power consumption for monitoring.

If the above premise cannot hold true for a specific type of V2X UE, for example, some UE (Pedestrian UE (P-UE) and Infrastructure UE (I-UE) may not have the requirement to receive sidelink services but only have the requirement to transmit sidelink services, the sidelink resources may be monitored only for the purpose of channel sensing, thus reducing the scope of monitoring sidelink resources by a UE and reducing power consumption.

UEs in the prior art are mainly Vehicle UEs (V-UEs), which are relatively insensitive to power consumption, so the prior art may run smoothly. However, considering that the V2X technology needs to be applied to more types of UEs, such as P-UEs, it is beneficial to enhance the existing channel sensing technology for the purpose of reducing power consumption.

Example embodiments of the disclosure are further described below with reference to the accompanying drawings.

Text and drawings are provided as examples only to help readers understand the disclosure. They are not intended and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

A slot in embodiments of the disclosure may be either a subframe or slot in a physical sense, or a subframe or slot in a logical sense. Specifically, a subframe or slot in a logical sense is a subframe or slot corresponding to a resource pool of sidelink communication. For example, in V2X systems, the resource pool is defined by a repeated bitmap, and the repeated bitmap is mapped to a specific slot set, which may be all slots or all other slots except some specific slots (such as slots for transmitting MIB/SIB). The slot indicated as "1" in the bitmap may be used for V2X transmission and belongs to the slots corresponding to the V2X resource pool; the slot indicated as "0" cannot be used for V2X transmission and does not belong to the slots corresponding to the V2X resource pool.

The difference between a subframe or slot in the physical sense and a subframe or slot in the logical sense is explained by a typical application scenario: when calculating the time-domain gap between two specific channels/messages (for example, a PSSCH carrying sidelink data and a PSFCH carrying corresponding feedback information), it is assumed that the gap is N slots; if sub-frames or slots in the physical sense are calculated, the N slots correspond to the absolute time length of N*x milliseconds in the time domain, where X is the time length of the physical time slot (sub-frame) in the numerology of the scene, the units of which are milliseconds; otherwise, if sub-frames or slots in the logical sense are calculated, using the sidelink resource pool defined by the bitmap as an example, the interval of the N slots corresponds to the N slots indicated as "1" in the bitmap, and the absolute time length of the interval varies with the specific configuration of the sidelink communication resource pool, without a fixed value.

Further, a slot in embodiments of the disclosure may be a complete slot or several symbols corresponding to the sidelink communication in the slot. For example, when the sidelink communication is configured to be performed on the X1-X2th symbols of each slot, a slot in the following embodiments is the X1-X2th symbols in the slot in this scenario; or, when the sidelink communication is configured as mini-slot transmission, a slot in the following embodiments is a mini-slot defined or configured in the sidelink system instead of a slot in the NR system; or, when the sidelink communication is configured as symbol-level transmission, a slot in the following embodiments may be replaced with symbols, or may be replaced with N symbols which are the time-domain granularity of the symbol-level transmission.

In embodiments of the disclosure, information configured by a base station, indicated by signaling, configured by a higher layer or preconfigured includes a set of configuration information; it also includes multiple sets of configuration information, from which the UE selects a set of configuration information to use according to predefined conditions; it also includes a set of configuration information including a plurality of subsets, from which the UE selects a subset for use according to predefined conditions. Some technical solutions provided in embodiments of this disclosure are specifically described based on a V2X system, but their application scenarios should not be limited to the V2X system in sidelink communication, but may also be applied to other sidelink transmission systems. For example, the design based on V2X subchannels in the following embodiments may also be used for D2D subchannels or other subchannels for sidelink transmission. The V2X resource pool in the following embodiments may also be replaced by a D2D resource pool in other sidelink transmission systems such as D2D.

In embodiments of the disclosure, when the sidelink communication system is a V2X system, the terminal or UE may be various types of terminals or UEs such as Vehicle type, Infrastructure type, Pedestrian type, etc.

In the disclosed embodiments, lower than a threshold may also be replaced by at least one of higher than the threshold, lower than or equal to the threshold and higher than or equal to the threshold; above (exceeding) a threshold may also be replaced by at least one of below the threshold, below or equal to the threshold, and above or equal to the threshold. Less than or equal to may also be replaced by at least one of less than, greater than, greater than or equal to, or equal to; greater than or equal to may also be replaced by at least one of less than, greater than, less than or equal to, or equal to.

In order to make the purpose, technical scheme and advantages of this disclosure clearer, embodiments of this disclosure will be further described in detail with reference to the accompanying drawings.

Figure 4:
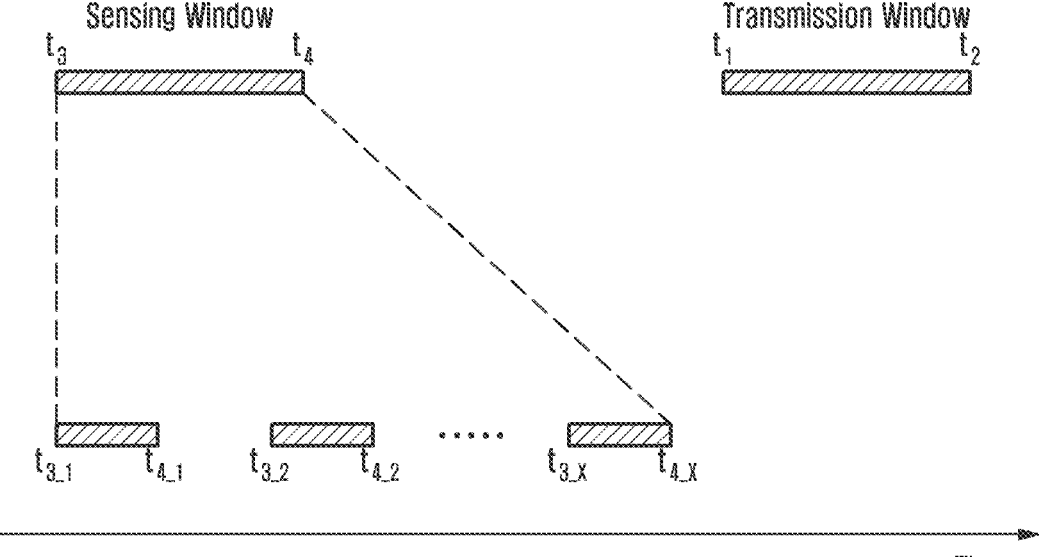
FIG. 4 illustrates a schematic diagram of a transmission window for transmitting a sidelink transmission and a sensing window for performing channel sensing according to various embodiments of the disclosure.

FIG. 4 illustrates a schematic diagram of a transmission window for transmitting a sidelink transmission and a sensing window for performing channel sensing according to various embodiments of the disclosure.

In an embodiment, a UE may serve as a transmitter of sidelink data, and can expect a time point or time range when a sidelink transmission is to be performed.

In some implementations, the UE determines a time range $[t_3, t_4]$ for channel sensing, and performs channel sensing within the time range $[t_3, t_4]$, and selects specific sidelink resources for transmitting sidelink transmissions according to the result of the channel sensing. Alternatively, if the UE expects that a sidelink transmission is to be transmitted within a specific time range $[t_1, t_2]$, it may determine the time range $[t_3, t_4]$ for channel sensing according to $[t_1, t_2]$, and perform channel sensing within the time range $[t_3, t_4]$, and select specific sidelink resources for transmitting the sidelink transmission within $[t_1, t_2]$ according to the result of the channel sensing. In this disclosure, for convenience of description, a time range (e.g., $[t_1, t_2]$) in which a sidelink transmission is expected to be transmitted is referred to as a transmission window, and a time range (e.g., $[t_3, t_4]$) for channel sensing is referred to as a sensing window.

In some embodiments, $t_1$ and/or $t_2$ may be the time when the UE acquires the data to be transmitted, for example, the time when the data arrives at the physical layer from a higher layer of the UE; it can also be the time when the UE is triggered to perform channel sensing; it can also be a start time point of a time range in which the sidelink transmission is expected to be transmitted, which is determined by the UE after acquiring the data to be transmitted. For example, the UE acquires data to be transmitted, or is triggered to perform channel sensing, in slot n; the candidate resources that can be used to transmit sidelink data are determined within the time interval [n+T1, n+T2]. In this example, $t_1$ may be n or n+T1; $t_2$ may be n+T2.

The way in which the UE is triggered to perform channel sensing includes obtaining channel sensing parameters configured by a higher layer, such as at least one of the following parameters:

the resource pool where the candidate resources that can be used to transmit sidelink data are located;

the priority, including the physical layer priority, which can be indicated by a parameter $prio_{TX}$;

the remaining packet delay budget (PDB);

the number of subchannels to be used for the PSSCH/PSCCH transmission in a slot, which can be indicated by a parameter $L_{subCH}$;

a resource reservation interval, which can be indicated by a parameter $P_{rsvp\_TX}$, in units of milliseconds or slots;

a set of resources associated with re-evaluation and/or pre-emption;

threshold parameters related to UE processing delay in resource selection process.

In some embodiments, $[t_1, t_2]$ is a set of candidate resources that the UE expects to be used to transmit the sidelink transmission, which may be discontinuous in time domain and frequency domain. For example, $[t_1, t_2]$ includes $[t_{1-1}, t_{2-1}], [t_{1-2}, t_{2-2}], \ldots [t_{1-n}, t_{2-n}]$; for example, each $[t_{1-n},$ $t_{2-n}$] is a candidate resource. In this embodiment, [$t_1$, $t_2$] for determining [$t_3$, $t_4$] may be any one or more sets of [$t_{1-1}$, $t_{2-1}$] . . . [$t_{1-n}$, $t_{2-n}$].

In some implementations, a method for the UE to determine the time range [$t_3$, $t_4$] for channel sensing, that is, the method for determining the sensing window, includes determining the sensing window [$t_3$, $t_4$] according to the transmission window [$t_1$, $t_2$] and using at least one of the following methods:

$t=t_0-a$ or $t=t_0-t_p$, where a and/or $t_p$ are configured by a higher layer or a base station, or are (pre)defined or (pre)configured;

$t=t_0+a$ or $t=t_0+t_p$, where a and/or $t_p$ are configured by a higher layer or a base station or (pre)defined or (pre) configured, and/or a and/or $t_p$ are determined according to the sidelink resources selected by the UE for transmitting the sidelink transmission;

$t=t_0-N*p$, where N and p are configured by a higher layer or a base station, or are (pre)defined or (pre)configured. Alternatively, p indicates a time-domain offset between sidelink transmission resources predetermined in SCI and the SCI, or p is determined based on the time-domain offset between the sidelink transmission resources predetermined in the SCI and the SCI;

$t=t_0-N*p-N'*p'$, where N and p are configured by a higher layer or a base station, or are (pre)defined or (pre)configured. Alternatively, p indicates a time-domain offset between the sidelink transmission resources predetermined in SCI and the SCI, or p is determined based on the time-domain offset between the sidelink transmission resources predetermined in the SCI and the SCI. Alternatively, p' indicates a period of the sidelink transmission resources predetermined in the SCI, or p' is determined based on the period of the sidelink transmission resources predetermined in the SCI;

$t_3=t_4-n$, where n is configured by a higher layer or a base station, or is (pre)defined or (pre)configured;

$t=t_4-N*p_m$, or $t_4=t_3+N*p_m$, where N and $p_m$ are configured by a higher layer or a base station, or are (pre) defined or (pre)configured;

determining [$t_3$, $t_4$] according to (pre)configured or (pre) defined information, and/or information obtained in SCI, and/or information obtained in a sidelink grant; wherein the above information includes at least one of: a time offset parameter for determining the sensing window, a period parameter for determining the sensing window, an index for determining the sensing window, a UE identity, geographic location information, $t_1$ and $t_2$;

determining [$t_3$, $t_4$], determining a time range for performing sensing according to [$t_1$, $t_2$], and using [$t_3$, $t_4$] within the time range as the sensing window; wherein [$t_3$, $t_4$] includes periodic [$t_3$, $t_4$].

Wherein t may be $t_3$ and/or $t_4$, and to includes at least one of: $t_0=t_1$, $t_0=t_2$, and to being an index of each and/or at least one time unit within the time range [$t_1$, $t_2$].

Alternatively, the parameters configured by a higher layer or a base station and/or (pre)defined or (pre)configured parameters in the above methods are configured/defined based on specific parameters, which include at least one of: a service priority, a cast type (e.g., unicast, multicast type 1, multicast type 2 and broadcast), a service target identity, a Channel Busy Ratio (CBR), a resource pool, a V2X carrier, a logical channel identifier (LCID), a HARQ process, and a sidelink grant.

For example, for $t_3=t_4-n$ in the above method, where n is determined based on a priority of a service (which may be indicated by a priority of the physical layer). For another example, for $t=t_0-N*p-N'*p'$ in the above method, where p' for indicating the period of the sidelink transmission resources predetermined in the SCI is determined based on the priority of the service (which may be indicated by the priority of the physical layer). The advantage of this method is that a service with higher priority may be configured with larger n or p', thereby avoiding possible interference and improve the reliability of the service through a longer sensing window or backtracking more sensing windows which are periodic; a service with lower priority may be configured with smaller N or p', thereby reducing the power consumption in the sensing process.

In some implementations, alternatively, when K methods of the above methods are used to determine the sensing window [$t_3$, $t_4$] and K>1, determining the sensing window further includes at least one of:

using any one of the K methods to determine at least one of $t_3$ and $t_4$, so as to determine the sensing window [$t_3$, $t_4$] and/or at least one set of values of the sensing window [$t_3$, $t_4$];

using any one of the K methods to independently determine one sensing window [$t_3$, $t_4$] and/or at least one set of values of the sensing window [$t_3$, $t_4$];

when a plurality of sensing windows [$t_3$, $t_4$] are determined, determining an intersection of the plurality of sensing windows [$t_3$, $t_4$] as a final sensing window [$t_3$, $t_4$];

when a plurality of sensing windows [$t_3$, $t_4$] are determined, determining a union of the plurality of sensing windows [$t_3$, $t_4$] as a final sensing window [$t_3$, $t_4$];

when more than one set of values of [$t_3$, $t_4$] is determined, determining an intersection of the more than one set of values as a certain set or more than one set of values of a final sensing window [$t_3$, $t_4$];

when more than one set of values of [$t_3$, $t_4$] is determined, determining a union of the more than one set of values as a certain set or more than one set of values of a final sensing window [$t_3$, $t_4$].

In the above implementations, the UE can expect a time point or time range at which a sidelink transmission is to be performed and determine the sensing window according to the transmission window. In some other implementations, the UE can determine the time point or time range of the sensing window, and determine the transmission window according to the sensing window by adopting the method corresponding to the above implementations. For example, in some other implementations, the UE determines the time point or time range of the sensing window according to the time point or time range at which the sidelink transmission needs to be transmitted; wherein the time point or time range at which the sidelink transmission needs to be transmitted may be a time point or time range at which a packet arrives at the physical layer from a higher layer. For example, the packet arrives at the physical layer from the higher layer in subframe t, and the UE determines that the time range of the sensing window is [$t+a_1$, $t+a_2$], where $a_1$ and $a_2$ are (pre) configured/(pre)defined parameters. For example, $a_1$ is determined based on a processing delay of the UE, and $a_2$ is determined based on a preset length or minimum length of the sensing window. For example, since the time domain span of resources reserved in the current period in SCI does not exceed 32 slots (including the current slot of SCI) at most, in order to enable the sensing window to be used for monitoring resources of the current period that any other UE may reserve in SCI, the preset length/minimum length of the sensing window is 31 slots, that is, the value or minimum value of the difference between $a_1$ and $a_2$ is 31.

In the prior art, the time point or time range when the UE expects to perform the sidelink transmission is determined according to the transmission time of the previous last packet or the time when the previous last packet arrives at the physical layer, and according to the time interval between packets. Generally, the time interval is indicated by a higher layer through the resource reservation interval parameter $P_{rsvp\_TX}$. When $P_{rsvp\_TX}$ which is not 0 is indicated by the higher layer, the UE can estimate the time when the next packet arrives at the physical layer and/or the time when the sidelink transmission is expected to be performed according to the previous last packet and the value of $P_{rsvp\_TX}$; this instance usually occurs in the scenario of periodic service. When $P_{rsvp\_TX}$ is not indicated by the higher layer, UE cannot estimate the arrival time of the next packet; this instance usually occurs in the scenario of aperiodic service. When $P_{rsvp\_TX}$ with a value of 0 is indicated by the higher layer, the UE cannot estimate the arrival time of the next packet; the instance may occur in the scenario of aperiodic service or can be used in the scenario of periodic service, for example, when $P_{rsvp\_TX}=0$, the sidelink resources occupied periodically by periodic services can be re-selected by the UE.

Alternatively, for the implementations where the UE can expect the time point or time range at which the sidelink transmission is to be performed and determine the sensing window according to the transmission window, the sensing window may be, in time domain, before a time when the UE expects that the sidelink transmission is to be performed, that is, before a time when the packet arrives at the physical layer from the higher layer; accordingly, the UE predicts whether the sidelink transmission is to be performed or not, and performs sensing in advance. Alternatively, for the implementations where the UE determines the time point or time range of the sensing window according to the time point or time range at which the sidelink transmission needs to be transmitted, the sensing window may be, in time domain, after a time when the UE needs to transmit the sidelink transmission, that is, after a time when the packet arrives at the physical layer from the higher layer; accordingly, the sensing process may be triggered by the sidelink transmission, that is, when the packet arrives at the physical layer from the higher layer, the UE is triggered to perform sensing.

For the above two methods for performing sensing, alternatively, the UE determines whether the sensing needs to be performed in advance and/or whether the sensing is triggered by the sidelink transmission, according to the delay of the service. For example, when a delay requirement of the service satisfies a predetermined/configured threshold range, the UE predicts when a packet carrying the service will arrive and performs the sensing in advance; otherwise, the UE is triggered to start the sensing process after the packet carrying the service arrives at the physical layer. The advantage of this method is that for services with loose delay requirements, the UE may start sensing only after there is an actual transmission requirement, thereby reducing the power consumption caused by possible unnecessary sensing.

In some implementations, the way in which the UE determines resources for sidelink transmissions includes at least one of legacy channel sensing, partial sensing in the above implementations, and random selection of resources. The UE selects the abovementioned ways according to at least one of the following parameters: a delay requirement of the service which may be indicated by a priority of the physical layer and/or QoS; a blocking degree of the resource pool which may be indicated by a Channel Busy Ratio (CBR); a priority of the service which may be indicated by a priority of the physical layer and/or QoS; a node corresponding to the service which may be indicated by a source ID and/or a destination ID.

Alternatively, the delay requirement of the service is determined based on a Packet Delay Budget (PDB) indicated directly or indirectly, and/or determined based on the priority of the service. Alternatively, the service priority is used to indirectly indicate a PDB of the service.

In some implementations, when the UE transmits a sidelink transmission, the selected way of determining resources for the sidelink transmission is indicated in the sidelink transmission. The indication may be explicit, and for example, legacy sensing (or full sensing), partial sensing or random selection are indicated by 2 bits, which may be included in the SCI, for example, in the first stage SCI format and/or the second stage SCI format, and may be 2 reserved bits in the first stage SCI format and/or the second stage SCI format. In this example, in the scenario where the UE using partial sensing or random selection shares the resource pool with the UE using legacy sensing, or both use (partially) overlapping resource pools (that is, the resource pool corresponding to partial sensing or random selection and the resource pool corresponding to legacy sensing are shared or (partially) overlapping), the UE receiving the indication can be enabled to correctly distinguish the three ways of legacy sensing, partial sensing and random selection.

For another example, partial sensing or random selection is indicated by 1 bit, which can be included in SCI, such as 1 reserved bit in the first stage SCI format and/or the second stage SCI format is used to indicate partial sensing or random selection. In this example, in the scenario where the resource pool of UE using partial sensing or random selection and the resource pool of UE using legacy sensing are not shared or overlapping, the UE receiving the indication can be enabled to correctly distinguish the two ways of partial sensing and random selection in the resource pool corresponding to partial sensing or random selection.

For another example, legacy sensing, partial sensing or random selection is indicated by 1 bit, and for example, '1' corresponds to legacy sensing, and '0' corresponds to partial sensing or random selection. The 1 bit may be included in the SCI, and for example, 1 reserved bit in the first stage SCI format and/or the second stage SCI format is used to indicate partial sensing or random selection. In this example, the UE receiving the indication may not distinguish partial sensing/random selection, or distinguish partial sensing and random selection by the method implicitly indicated in the following examples.

In the above examples, the way of determining resources for sidelink transmission selected by the UE is explicitly indicated in SCI. Similarly, this way can also be indicated in MAC signaling (such as MAC CE, MAC head, MAC header, LCID, etc.) and/or RRC signaling.

In some embodiments, the way of determining resources for sidelink transmission selected by UE is indicated based on SCI format. For example, different SCI formats correspond to at least one of legacy sensing, partial sensing and random selection, and when performing sidelink transmission, the UE adopts the SCI format corresponding to the selected way of determining resources for sidelink transmission. Since the actually transmitted SCI format is indicated in the first stage SCI and/or the second stage SCI through a specific field (for example, the second stage SCI format field in SCI format 0-1 of Release 16), this method can also be understood as one of the explicit indication methods.

The indication may also be implicit, for example, indirectly indicated by a mapping between the physical layer priority and the way of determining the resources for the sidelink transmission. The advantage of the implicit indication method is that random selection and/or partial sensing may be mapped to a higher physical layer priority, so that when other UEs using full sensing detect that their own transmissions conflict with the transmission of the UE using random selection and/or partial sensing, if its own transmission priority is lower than the detected higher physical layer priority, the UEs using full sensing will start resource reselection, drop previously reserved resources and select new resources for transmission, thereby avoiding the above conflict. The method may be forward compatible with the existing system, reducing the collision probability in the system on the premise that a UE in the existing system does not need to update the technology.

Alternatively, the UE supports random selection and/or partial sensing or is configured to use random selection and/or partial sensing, and obtains a priority corresponding to the transmission based on random selection and/or partial sensing. Obtaining the priority corresponding to the transmission based on random selection and/or partial sensing includes at least one of:

obtaining a priority (e.g., QoS) indicated by a higher layer, mapping it to a physical layer priority p0 according to the method in the prior art, and/or determining the physical layer priority P0 according to other methods in the prior art; then, if the transmission uses random selection and/or partial sensing, the priority of the physical layer is determined to be p1=p0−delta p, where delta p is a priority offset corresponding to random selection and/or partial sensing, which is configured/preconfigured (predefined) by a higher layer or a base station; wherein random selection and partial sensing may correspond to different values of delta p respectively;

obtaining a priority (for example, QoS) indicated by a higher layer, and mapping it to a physical layer priority P1 by using a (pre)configured/(pre)defined method dedicated to random selection and/or partial sensing; for example, a mapping table of QoS to a priority of the physical layer, which is dedicated to random selection and/or partial sensing, is used.

Alternatively, if the UE selects sidelink resources for a subsequent transmission, but detects that the transmission conflicts with resources reserved by other UEs before actually performing the transmission, the UE triggers resource reselection and reselects resources for the subsequent transmission, when a predetermined condition is satisfied. The predetermined condition includes at least one of: a delay requirement of the service being sufficient for resource reselection; a processing delay of the UE being sufficient for resource reselection; service priorities of other UEs corresponding to the conflict satisfying a specific threshold interval, where the threshold interval includes an interval dedicated to the conflict with random selection and/or partial sensing; other UEs corresponding to the collision indicating that their transmissions use random selection and/or partial sensing.

In some implementations, after determining the sensing window [$t_3$, $t_4$], the method for the UE to select the specific sidelink resources for transmitting the sidelink transmission according to the result of the channel sensing includes at least one of:

excluding reserved resources within [$t_1$, $t_2$], which include sidelink resources indicated in SCI received by the UE in [$t_3$, $t_4$]; wherein the sidelink resources indicated in the SCI include resources reserved by a transmitter UE of the SCI for its subsequent transmission;

excluding reserved resources within [$t_1$, $t_2$], which include sidelink resources indicated in SCI and/or a higher layer signaling received by the UE in [$t_3$, $t_4$]; wherein the sidelink resources indicated in the SCI and/or higher layer signaling include resources determined by a transmitter UE of the SCI and/or higher layer signaling that have been reserved by itself and/or other sidelink UEs;

retaining specific resources within [$t_1$, $t_2$], and/or excluding other resources except for the specific resources within [$t_1$, $t_2$], where the specific resources include sidelink resources indicated in SCI and/or a higher layer signaling received by the UE in [$t_3$, $t_4$]; wherein the sidelink resources indicated in the SCI and/or higher layer signaling include resources determined by a transmitter UE of the SCI and/or higher layer signaling that may be used by other UEs;

using sensing results of other UEs received within [$t_1$, $t_2$] or on other resources as its own sensing result;

using sidelink resources scheduled by other UEs for the UE which are received within [$t_1$, $t_2$] or on other resources as the specific sidelink resources for transmitting the sidelink transmission;

selecting the specific sidelink resources for transmitting the sidelink transmission from remaining sidelink resources within [$t_1$, $t_2$].

In some implementations, alternatively, the method for the UE to select the specific sidelink resources for transmitting the sidelink transmission according to the result of the channel sensing further includes: after receiving sidelink resources indicated in SCI and/or a higher layer signaling, determining validity of the indication, and if the indication is valid, selecting the specific sidelink resources for transmitting the sidelink transmission according to the indication; otherwise, if the indication is invalid, not selecting the specific sidelink resources for transmitting the sidelink transmission according to the indication.

According to some implementations of the disclosure, it is considered to determine a channel sensing range based on a time point triggering channel sensing, or to determine a channel sensing range which is periodic, thereby reducing the power consumption of the UE for monitoring a sidelink; by properly formulating a range of channel sensing, this ensures that the method of partial sensing in this disclosure and the method of keeping monitoring throughout have the same performance or little difference with respect to channel sensing.

In an embodiment, the UE may serve as a transmitter of sidelink data, and can expect the time point or time range when the sidelink transmission is to be performed. This embodiment is mainly applicable to data services periodically arriving among sidelink data services, for example, data services in which a V2X UE periodically broadcasts its own geographic location, speed, acceleration and other vehicle driving related information, etc.; this embodiment may also be used for burst type or other types of services in combination with other mechanisms, such as a mechanism determining or indicating a time when burst data arrives at the physical layer by a higher layer.

The UE expects that a sidelink transmission is to be transmitted within a specific time range $[t_1, t_2]$, and it may determine the time range $[t_3, t_4]$ for channel sensing according to $[t_1, t_2]$, perform channel sensing within the time range $[t_3, t_4]$, and select specific sidelink resources for transmitting the sidelink transmission within $[t_1, t_2]$ according to the result of the channel sensing. In this disclosure, for convenience of description, a time range (e.g., $[t_1, t_2]$) in which a sidelink transmission is expected to be transmitted is referred to as a transmission window, and a time range (e.g., $[t_3, t_4]$) for channel sensing is referred to as a sensing window.

In this disclosure, a set $[a, b]$ is only an example, and can be replaced by any one of $(a, b]$, $[a, b)$ and $(a, b)$. a and b can be any group of set boundaries involved in this disclosure, for example, a and b are $t_1$ and $t_2$ respectively, or a and b are $t_3$ and $t_4$ respectively.

Wherein $t_2$ may be greater than or equal to $t_1$, and $t_4$ may be greater than or equal to $t_3$; $t_1$, $t_2$, $t_3$ and $t_4$ may be indexes of slots, OFDM symbols, subframes or other time units. $[t_3, t_4]$ may include one or more sets of values, and for example, as shown in FIG. 4, $[t_3, t_4]$ may include a total of X sets of values including $[t_{3\_1}, t_{4\_1}]$, $[t_{3\_2}, t_{4\_2}]$, ..., and $[t_{3\_X}, t_{4\_X}]$.

FIG. 4 illustrates an example of a transmission window and a sensing window in the time domain, but the disclosure is not limited thereto, and the transmission window and sensing window of the disclosure also include various examples in the frequency domain and/or the code domain.

In addition, the sidelink transmission expected to be transmitted may include at least one of a PSCCH, a PSSCH, and a PSFCH.

Figure 5:
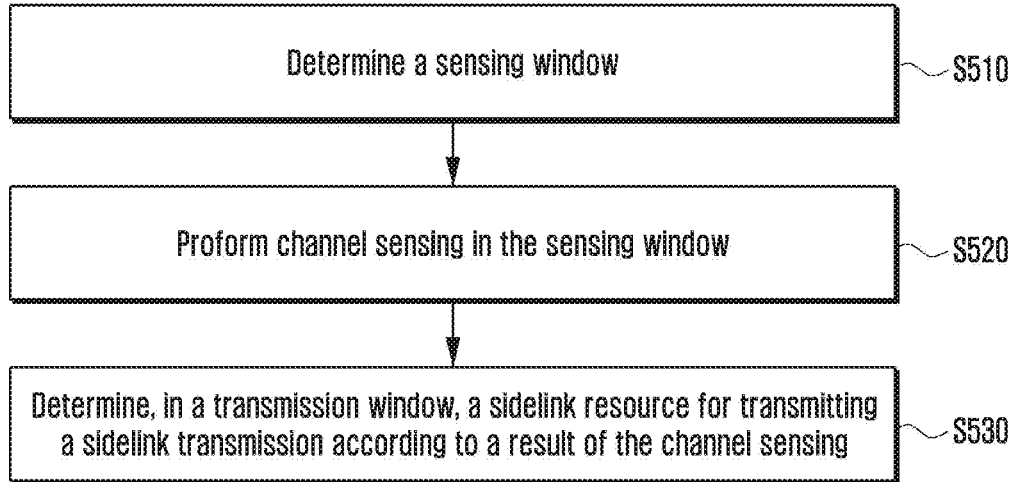
FIG. 5 illustrates a flowchart of a method for determining a sidelink resource according to various embodiments of the disclosure.

FIG. 5 illustrates a flowchart of a method 500 for determining a sidelink resource according to various embodiments of the disclosure.

Referring to FIG. 5, at step S510, a sensing window is determined.

In an embodiment, the method of determining a sensing window $[t_3, t_4]$ according to a transmission window $[t_1, t_2]$ may include at least one of the following methods. t in the following methods may be $t_3$ and/or $t_4$, and to in the following methods includes at least one of: $t_0 = t_1$, $t_0 = t_2$, and to being an index of each and/or at least one time unit in the time range $[t_1, t_2]$.

In some embodiments, $t_1$ and/or $t_2$ may be the time when the UE acquires the data to be transmitted, for example, the time when the data arrives at the physical layer from a higher layer of the UE; it can also be the time when the UE is triggered to perform channel sensing; it can also be a start time point of a time range in which the sidelink transmission is expected to be transmitted, which is determined by the UE after acquiring the data to be transmitted. For example, the UE acquires data to be transmitted, or is triggered to perform channel sensing, in slot n; the candidate resources that can be used to transmit sidelink data are determined within the time interval $[n+T1, n+T2]$. In this example, $t_1$ may be n or $n+t_1$; $t_2$ may be $n+T2$.

The way in which the UE is triggered to perform channel sensing includes obtaining channel sensing parameters configured by a higher layer, such as at least one of the following parameters:

the resource pool where the candidate resources that can be used to transmit sidelink data are located;

the priority, including the physical layer priority, which can be indicated by a parameter $prio_{TX}$;

the remaining packet delay budget (PDB);

the number of subchannels to be used for the PSSCH/PSCCH transmission in a slot, which can be indicated by a parameter $L_{subCH}$;

a resource reservation interval, which can be indicated by a parameter $P_{rsvp\_TX}$, in the units of milliseconds or slots;

a set of resources associated with re-evaluation and/or pre-emption;

threshold parameters related to UE processing delay in resource selection process.

In some embodiments, $[t_1, t_2]$ is a set of candidate resources that the UE expects to be used to transmit the sidelink transmission, which may be discontinuous in time domain and frequency domain. For example, $[t_1, t_2]$ includes $[t_{1\text{-}1}, t_{2\text{-}1}]$, $[t_{1\text{-}2}, t_{2\text{-}2}]$, ..., $[t_{1\text{-}n}, t_{2\text{-}n}]$; for example, each $[t_{1\text{-}n}, t_{2\text{-}n}]$ is a candidate resource. In this embodiment, $[t_1, t_2]$ for determining $[t_3, t_4]$ may be any one or more sets of $[t_{1\text{-}1}, t_{2\text{-}1}]$ ... $[t_1, t_2 \ n]$.

In an embodiment, $t = t_0 + a$, or $t = t_0 - t_p$, or $t = t_0 - t_p + a$, or $t = t_0 - t_p + a$, where $t_p$ is configured by a higher layer or a base station, or $t_p$ is (pre)defined or (pre)configured; alternatively, $t_p$ indicates a processing delay or $t_p$ is not less than the processing delay, which may be a processing delay of a UE processing a result of channel sensing and determining specific resources for a sidelink transmission according to the result of the channel sensing, and may be (pre)configured or (pre)defined, for example, determined according to a (pre)configured UE capability. a is a (pre)defined or (pre)configured non-negative integer for adjusting a start/end position of a sensing window.

In another embodiment, $t = t_0 + a$, or $t = t_0 + t_p$. or $t = t_0 + t_p + a$, or $t = t_0 + t_p - a$, where $t_p$ is configured by a higher layer or a base station, or $t_p$ is (pre)defined or (pre)configured; optionally, $t_p$ indicates the processing delay or $t_p$ is not less than the processing delay, which may be a processing delay of a UE processing a result of channel sensing and determining specific resources for a sidelink transmission according to the result of channel sensing, or the processing delay of continuing channel sensing after determining specific resources for sidelink transmission; it can be (pre-)configured or (pre-)defined, for example, determined according to (pre-)configured UE capabilities. a is a (pre-)defined or (pre-)configured non-negative integer for adjusting the start/end position of the sensing window. Optionally, in this embodiment, $t = t3$. In still another embodiment, $t = t_0 + a$, or $t = t_0 + t_p$, or $t = t_0 + t_p + a$, or $t = t_0 + t_p - a$, the meaning of $t_p$ is similar to that in the previous embodiment, and a is determined according to the sidelink resource selected by UE for transmitting the sidelink transmission. For example, when the sidelink resource selected by the UE for transmitting the sidelink transmission is in slot $t+m$, $a = m$ or $a = m-1$. Optionally, in this embodiment, $t = t_4$. A typical application scenario corresponding to these two embodiments is that after selecting or reserving the sidelink resources for transmitting the sidelink transmission, the UE can continue to monitor the sidelink resources until starting to transmit the sidelink transmission; if a potential conflict is monitored during this period of time (for example, it is monitored that other UEs reserve the same or partially overlapping resources with the resources selected or reserved by itself, and the priority of the other UEs is higher), the UE can trigger resource reselection. This process is commonly referred to as re-evaluation and/or pre-emption in the sidelink system of Release 16. Accordingly, the UE monitors on the sensing windows corresponding to these two embodiments, and the monitored results can be used for re-evaluation and/or pre-emption. Optionally, the UE uses the method when configured to enable the method, otherwise the UE does not use the method; whether to enable the method can be preconfigured, configured by a higher layer, or configured by a base station; this configuration can be included in the resource pool configuration or the configuration signaling broadcast by the base station, and also in the UE-specific configuration signaling. Optionally, the UE determines whether to use the method according to at least one of the service type (e.g., periodic/aperiodic service), whether the UE can expect the time point or time range for the sidelink transmission, the priority corresponding to the data, and the remaining PDB corresponding to the data. Optionally, this method is associated with other sensing methods, and for example, when the UE is configured to enable one or at least one of other sensing methods in this specification, this method is also enabled accordingly, otherwise, this method is not enabled.

In another embodiment, $t=t_0-N^*p$, where N and p are configured by a higher layer or a base station, or are (pre)defined or (pre)configured. Alternatively, p indicates a time-domain offset between the sidelink transmission resources predetermined in SCI and the SCI, or p is determined based on the time-domain offset between the sidelink transmission resources predetermined in the SCI and the SCI; wherein the time-domain offset is (pre)defined or (pre)configured and includes one or more values; when the time-domain offset includes a plurality of values, a value of t is determined according to one value, and/or multiple values, and/or the largest value, and/or each value of the plurality of values. Alternatively, N is configured by a higher layer or a base station and includes a value or a set of values. Alternatively, N is configured by a higher layer or a base station or is any positive integer or any non-negative integer, and $N^*p$ is less than or equal to $T_{period}$; or, N is configured by a higher layer or a base station or is any positive integer or any non-negative integer, and $t=t_0-N^*p$ is greater than or equal to $T_{period}$. $T_{period}$ is configured by a higher layer or a base station, or is (pre)defined or (pre)configured, and this parameter may be used to define the earliest start position or length of the sensing window. Further, $t=t_0-N^*p+a$, where a is a (pre)defined or (pre)configured non-negative integer for adjusting the start/end position of the sensing window. A typical application scenario corresponding to this embodiment is that a UE in a sidelink system may reserve resources for a subsequent transmission in SCI, and a time span of resources reserved in the SCI does not exceed p. In this scenario, this embodiment may make the start position of the sensing window correspond to a time with a forward length of p or $N^*p$ from the start position of the transmission window or any resource, so that the time range of the sensing window may cover the transmission time range of the SCI of any resources possibly reserved in the transmission window; also, the duration of the sensing window may be reduced as much as possible without affecting sensing effect, thereby reducing the power consumption in a sensing process. Optionally, the UE uses the method when configured to enable the method, otherwise the UE does not use the method; whether to enable the method can be preconfigured, configured by a higher layer, or configured by a base station; this configuration can be included in the resource pool configuration or the configuration signaling broadcast by the base station, and also in the UE-specific configuration signaling. Optionally, the UE determines whether to use the method according to at least one of the service type (e.g., periodic/aperiodic service), whether the UE can expect the time point or time range for the sidelink transmission, the priority corresponding to the data, and the remaining PDB corresponding to the data. For example, the method is used when the UE can expect the time point or time range for the sidelink transmission and/or the priority corresponding to the data satisfies a threshold range. Optionally, this method is associated with other sensing methods, and for example, when the UE is configured to enable one or at least one of other sensing methods in this specification, this method is also enabled accordingly, otherwise, this method is not enabled.

In another embodiment, $t=t_0-N^*p-N'^*p'$, where the definitions and uses of N and p are similar to those in the previous method. Alternatively, p' indicates a period of the sidelink transmission resources predetermined in the SCI, or p' is determined based on the period of the sidelink transmission resources predetermined in the SCI; wherein the period is (pre)defined or (pre)configured and includes one or more values; when the period includes a plurality of values, a value of t is determined according to one value, and/or multiple values, and/or the largest value, and/or each value of the plurality of values. Alternatively, N' is configured by a higher layer or a base station and includes a value or a set of values. Further, $t=t_0-N^*p-N'^*p'+a$, where a is a (pre) defined or (pre)configured non-negative integer for adjusting the start/end position of the sensing window; alternatively, $a=t_p$. A typical application scenario corresponding to this embodiment is that a UE in a sidelink system may reserve resources for a subsequent transmission in SCI, and resources for the current period and the next period may be reserved in the SCI, where a time span of the resources reserved in the current period does not exceed p, and a time of the resources reserved in the next period is determined by the resources reserved in the current period, and for example, if resources on slot t are reserved in the current period, resources on slot t+p' are reserved, where p' is a length of a period corresponding to the reserved resources in the SCI. This scenario may be further extended for UE to reserve resources in the current period and the subsequent N' periods in SCI. In this scenario, the offset $N^*p$ in this embodiment corresponds to the SCI for reserving resources in the current period, which is similar to the previous embodiment, and the offset $N'^*p'$ is introduced, which corresponds to the SCI for reserving resources after N' periods; therefore, a time range of the sensing window may cover the transmission time range of the SCI of any resources possibly reserved in the transmission window in the same period, and the transmission time range of the SCI of any resources possibly reserved in the transmission window in the previous period; also, the duration of the sensing window may be reduced as much as possible without affecting sensing effect, thereby reducing the power consumption in a sensing process. Optionally, p' is a set of lengths of periods corresponding to the reserved resources in the SCI configured by the resource pool, or p' is a subset of lengths of periods corresponding to the reserved resources in the SCI; for the latter, the subset may be configured by a base station/configured by a higher layer/preconfigured, and/or determined based on the priority and/or blocking degree of the resource pool. For example, the UE acquires the priority-specific subset configured by the base station, and when transmitting data, uses the priority-specific subset corresponding to the data in the channel sensing process for the resources used by the data; for another example, when the blocking degree of the resource pool is lower than a threshold, the subset corresponding to the threshold is used, otherwise, other subsets or the whole set is used. Optionally, the UE uses the method when configured to enable the method, otherwise the UE does not use the method; whether to enable the method can be preconfigured, configured by a higher layer, or configured by a base station; this configuration can be included in the resource pool configuration or the configuration signaling broadcast by the base station, and also in the UE-specific configuration signaling. Optionally, the UE determines whether to use the method according to at least one of the service type (e.g., periodic/aperiodic service), whether the UE can expect the time point or time range for the sidelink transmission, the priority corresponding to the data, and the remaining PDB corresponding to the data. For example, the method is used when the UE can expect the time point or time range for the sidelink transmission and/or the priority corresponding to the data satisfies a threshold range. Optionally, this method is associated with other sensing methods, and for example, when the UE is configured to enable one or at least one of other sensing methods in this specification, this method is also enabled accordingly, otherwise, this method is not enabled.

In another implementation, $t_3=t_4-n$, where n is configured by a higher layer or a base station, or is (pre)defined or (pre)configured; alternatively, n=0, that is, $[t_3, t_4]$ includes a subframe $t_3$.

In another implementation, $t_3=t_4-N^*p_m$, or $t_4=t_3+N^*p_m$, where N and $p_m$ are configured by a higher layer or a base station, or are (pre)defined or (pre)configured. Alternatively, $p_m$ indicates a maximum value of a time-domain offset between the sidelink transmission resources predetermined in SCI and the SCI, or $p_m$ is determined based on the maximum value of the time-domain offset between the sidelink transmission resources predetermined in the SCI and the SCI; wherein the maximum value is (pre)defined or (pre)configured; further, $t_3=t_4-N^*p_m+a$ or $t_4=t_3+N^*p_m+a$, where a is a (pre)defined or (pre)configured non-negative integer for adjusting a window length of the sensing window. A typical application scenario corresponding to this embodiment is that a UE in a sidelink system may reserve resources for a subsequent transmission in SCI, and a time span of resources reserved in the SCI does not exceed $p_m$ within at least one period. In this scenario, this embodiment may make a time length of the sensing window be determined based on that the time span of the resources reserved in the SCI does not exceed $p_m$, and make the time range of the sensing window cover the transmission time range of the SCI of any resources possibly reserved in the transmission window by selecting an appropriate start position or end position of the sensing window; also, the duration of the sensing window may be reduced as much as possible without affecting sensing effect, thereby reducing the power consumption in a sensing process.

In another implementation, $t_3$ and/or $t_4$ are (pre)defined or (pre)configured.

The method for determining a sensing window according to an embodiment of the disclosure has been described above. It is considered that a channel sensing range is determined based on a time point triggering channel sensing, the power consumption of a UE monitoring sidelink is reduced.

Alternatively, the parameters configured by a higher layer or a base station and/or (pre)defined or (pre)configured parameters in the above methods are configured/defined based on specific parameters, which include at least one of: a service priority, a cast type (e.g., unicast, multicast type 1, multicast type 2 and broadcast), a service target identity, a Channel Busy Ratio (CBR), a resource pool, a V2X carrier, a logical channel identifier (LCID), a HARQ process, and a sidelink grant.

In some implementations, alternatively, when K methods of the above methods are used to determine the sensing window $[t_3, t_4]$ and K>1, determining the sensing window further includes at least one of:

using any one of the K methods to determine at least one of $t_3$ and $t_4$, so as to determine the sensing window $[t_3, t_4]$;

using any one of the K methods to independently determine one sensing window $[t_3, t_4]$;

when a plurality of sensing windows $[t_3, t_4]$ are determined, determining an intersection of the plurality of sensing windows $[t_3, t_4]$ as a final sensing window $[t_3, t_4]$;

when a plurality of sensing windows $[t_3, t_4]$ are determined, determining a union of the plurality of sensing windows $[t_3, t_4]$ as a final sensing window $[t_3, t_4]$.

In some implementations, when $[t_3, t_4]$ includes multiple sets of values, the above method for determining $[t_3, t_4]$ may be used to determine a certain set or more than one set of values in $[t_3, t_4]$; the multiple sets of values of $[t_3, t_4]$ may adopt different methods for determining $[t_3, t_4]$ or adopt the same method.

In some implementations, when $[t_3, t_4]$ includes multiple sets of values and $[t_3, t_4]$ is determined using K methods of the above methods and K>1, including at least one of:

using any one of the K methods to determine at least one of $t_3$ and $t_4$ in a certain set or more than one set of values of $[t_3, t_4]$, so as to determine a certain set or more than one set of values of $[t_3, t_4]$;

using any one of the K methods to independently determine a certain set or more than one set of values of $[t_3, t_4]$;

when more than one set of values of $[t_3, t_4]$ is determined, determining an intersection of the more than one set of values as a certain set or more than one set of values of a final sensing window $[t_3, t_4]$;

when more than one set of values of $[t_3, t_4]$ is determined, determining a union of the more than one set of values as a certain set or more than one set of values of a final sensing window $[t_3, t_4]$.

At least one method in the above implementations is used to determine the sensing window, which may help to collect reserved information more completely, make the finally determined sensing window range more flexible, and reduce unnecessary monitoring.

The above method will be described in detail with specific examples below.

In some implementations, in a case where p indicates the time-domain offset between the sidelink transmission resources predetermined in the SCI and the SCI, or $p_m$ indicates the maximum value of the time-domain offset between the sidelink transmission resources predetermined in the SCI and the SCI, a specific example is that in V2X communication system of Release 16, 2 or 3 sidelink resource positions may be indicated in a sidelink control information (SCI), and the indicated sidelink resource positions are distributed in a time window with a length of 32 slots in the resource pool. In this example, the 32 slots are the maximum value of the time-domain offset between the sidelink transmission resources predetermined in the SCI and the SCI. The maximum value of the time-domain offset between the sidelink transmission resources predetermined in the SCI and the SCI may be explicitly indicated or configured, and for example, in a table timeGapFirstSidelinkTransmission configured by a higher layer for indicating the time-domain position of the sidelink resources, each index corresponds to a value of the time-domain offset of the sidelink transmission resources predetermined in the SCI and the SCI, and the maximum value corresponding to all indexes in the table is the maximum value of the time-domain offset between the sidelink transmission resources predetermined in the SCI and the SCI; it may also be indirectly reflected by defining fields in the SCI instead of explicitly indicating in the specification, and for example, the fields used to indicate time-frequency resources in the SCI are defined in the specification to indicate time-frequency resource positions after 32 slots at most, and this definition method may be considered as implicitly indicating that the maximum value of the time-domain offset between the sidelink transmission resources predetermined in the SCI and the SCI is 32. In this example, the UE considers that $p_m$ is the maximum value of the time-domain offset between the sidelink transmission resources predetermined in the SCI and the SCI, that is, $p_m=32$, without any other dedicated configuration.

It should be noted that the maximum value of this time-domain offset may be calculated with or without a slot in which the SCI is located. For example, a sidelink resource with a latest time-domain location which may be predetermined by SCI transmitted on slot n is in slot n+31, and at this time, if the slot in which the SCI is located is not calculated, the maximum value of the time-domain offset between the latest sidelink resource and the SCI is considered to be 32 slots, and if the slot in which the SCI is located is calculated, the maximum value of the time-domain offset between the latest sidelink resource and the SCI is considered to be 31 slots. For example, if a value of the time-domain offset indicated by each index in the table timeGapFirstSidelinkTransmissio configured by a higher layer is m, a slot offset with or without the slot in which the SCI is located being calculated or not calculated is m and m+1, respectively. These different calculation methods may be used in this embodiment.

In the above method, the time-domain offset between the sidelink transmission resources predetermined in the SCI and the SCI, and the maximum value of the time-domain offset between the sidelink transmission resources predetermined in the SCI and the SCI may also be replaced by a time-domain offset or a maximum value of the time-domain offset between sidelink resources indicated in a sidelink grant (including dynamic grant, configured grant type 1 and configured grant type 2). The specific method of determining the offset or the maximum value of the offset is similar to that in the above examples, and the description will not be repeated.

In the above method, when N is configured based on a specific parameter, a specific example is that the specific parameter is a service priority, and a base station configures an independent value of N for each service priority. Another specific example is that the specific parameter is a LCID, and a base station configures an independent value of N for each LCID set, and each LCID set includes one or more specific LCIDs.

In a specific example, the UE expects that the sidelink transmission is to be transmitted within the transmission window $[t_1, t_2]$, and determines the sensing window $[t_3, t_4]$ according to $[t_1, t_2]$. $t_1$, $t_2$, $t_3$ and $t_4$ are indexes of slots.

The sensing window $[t_3, t_4]$ determined by the UE is: $[t_3, t_4]=[t_1-t_p-N*p_m+1, t_1-t_p]$; or, the sensing window $[t_3, t_4]$ determined by the UE is: $[t_3, t_4]=[t_1-N*p_m+1, t_1-t_p]$.

Where $t_p$ represents a processing delay for the UE to process a result of channel sensing and determine specific resources for a sidelink transmission according to the result of the channel sensing. The delay is (pre)configured or (pre)defined, for example, determined according to a UE capability. The length of the sensing window is $N*p_m$, where $p_m$ indicates a maximum value of a time-domain offset between the sidelink transmission resources predetermined in SCI and the SCI. Alternatively, if the maximum value of the time-domain offset indicated in the table timeGapFirstSidelinkTransmission configured by a higher layer is 32, it is determined that $p_m=32$; N is a positive integer configured by a base station.

In this example, the length of the sensing window determined by the UE is an integer multiple of a time range of resources that may be reserved by SCI in the sidelink system. The main advantage of this example is that in the prior art, SCI transmitted by a sidelink UE in slot n may indicate sidelink resources from slot n to slot $n+p_m$ (or $n+p_m-1$), and the indicated sidelink resources are considered as being reserved by a UE transmitting the SCI, therefore, when the UE performs a sensing process and needs to determine whether the sidelink resources on slot K are reserved by other UEs, it is necessary to monitor sidelink resources indicated in SCI on slot $K-p_m$ (or $K-p_m+1$) to slot $K-1$. Accordingly, in order to collect resource reservation information of other UEs in the transmission window, the sensing window needs to last for at least $p_m$ slots. In addition, considering that it takes a certain amount of time for the UE to process the sensing information, the end position of the sensing window may be earlier than the slot $K-1$, so the length of the sensing window is defined as configurable $N*p_m$, which helps to collect sidelink resource reservation information of other UEs more completely.

In another specific example, the UE expects that the sidelink transmission is to be transmitted within the transmission window $[t_1, t_2]$, and determines the sensing window $[t_3, t_4]$ according to $[t_1, t_2]$. $t_1$, $t_2$, $t_3$ and ty are indexes of slots.

The UE determines two sensing windows $[t_3, t_4]$, which are $[t_{3\_1}, t_{4\_1}]=[t_1-t_p-N*p_m+1, t_1-t_p]$, and $[t_{3\_2}, t_{4\_2}]=[t_1-t_p-N*p_m-N*p'+1, t_1-t_p-N'p']$. The UE performs channel sensing in both sensing windows, and uses results of the channel sensing in both sensing windows to select resources in the transmission window.

The determination method and physical meaning of the sensing window $[t_{3\_1}, t_{4\_1}]$ are similar to those in the previous example, and the description will not be repeated. With respect to the sensing window $[t_{3\_2}, t_{4\_2}]$, where p' indicates a period of sidelink transmission resources predetermined in SCI, alternatively, p' is a period of sidelink transmission resources predetermined in the SCI, which is indicated in RRC parameter SL-ResourceReservePeriod; N' is a positive integer configured by a base station. Alternatively, if the UE is configured with multiple p', the sensing window $[t_{3\_2}, t_{4\_2}]$ includes a time range corresponding to each p'; for example, assuming that $p'=\{500, 1000\}$, the unit is slot, and N'=1, the sensing window $[t_{3\_2}, t_{4\_2}]$ includes two subwindows, $\{[t_1-t_p-N*p_m-500+1, t_1-t_p-500]$ and $[t_1-t_p-N*p_m-1000+1, t_1-t_p-1000]\}$. Or, if the UE is configured with multiple p', the sensing window $[t_{3\_2}, t_{4\_2}]$ includes values of $[t_{3\_2}, t_{4\_2}]$ determined based on a certain p', and/or multiple p', and/or the largest p'.

In this example, the UE determines two sensing windows, $[t_{3\_1}, t_{4\_1}]$ corresponding to sidelink resources of the current period reserved by other UEs in SCI, and $[t_{3\_2}, t_{4\_2}]$ corresponding to sidelink resources of the next period reserved by other UEs in SCI of the previous period. The main advantage of this example is that in the prior art, SCI transmitted by a UE in slot n may reserve sidelink resources from slot n to slot $n+p_m$ (or $n+p_m-1$), and additionally indicate a period p' of the reserved resources, which is used to reserve sidelink resources in the corresponding slots in the next period, that is, from slot n+p' to slot n+$p_m$+p' (or n+$p_m$+p'−1), therefore, when the UE performs a sensing process and needs to determine whether the sidelink resources on slot K are reserved by other UEs, it needs to monitor reservation of resources of the current period in the SCI, that is, the sidelink resources indicated in the SCI from slot K−$p_m$ (or K−$p_m$+1) to slot K−1; it also needs to monitor reservation of the resources of the next period in the SCI in the previous period, that is, the sidelink resources indicated in the SCI from slot K−$p_m$−p' (or K−$p_m$−p'+1) to slot K−p'−1. The start/end position of the sensing window is defined as being based on configurable N*$p_m$ and N'*p', which helps to collect sidelink resource reservation information of other UEs more completely.

In another specific example, the UE expects that the sidelink transmission is to be transmitted within the transmission window [$t_1$, $t_2$], and determines the sensing window [$t_3$, $t_4$] according to [$t_1$, $t_2$]. $t_1$, $t_2$, $t_3$ and $t_4$ are indexes of slots.

According to a slot to of [$t_1$, $t_2$] in the transmission window, the UE determines that the sensing windows [$t_3$, $t_4$] corresponding to the slot are: [$t_3$, $t_4$]=[$t_0$−N*$p_m$+1, $t_0$−1] and [$t_3$, $t_4$]=[$t_0$−N*$p_m$−N'*p'+1, $t_0$−N'*p'−1]. The UE takes the sensing windows corresponding to all slots included in [$t_1$, $t_2$] in the transmission window as a final sensing window. The determination methods and physical meanings of N, $p_m$, N' and p' are similar to those in the previous example, so the description will not be repeated.

In this example, the UE determines the sensing window corresponding to each slot in the transmission window according to the slot, and takes a union of the sensing windows corresponding to all slots in the transmission window as the final sensing window. The main advantage of this example is that determining the sensing window corresponding to each slot in the transmission window according to the slot ensures that SCI which may reserve sidelink resources on the slot is transmitted in the sensing window, and taking the union of sensing windows corresponding to all slots in the transmission window as the final sensing window may make a range of the finally determined sensing window more flexible and reduce unnecessary monitoring.

In another specific example, the UE determines that another sensing window [$t_3$, $t_4$] is: [$t_3$, $t_4$]=[$t_1$−N*$p_m$−N'*p'+1, $t_1$−$t_p$], and takes an intersection of [$t_3$, $t_4$] and [$t_{3'}$, $t_{4'}$] as the final sensing window. The method may also be replaced by [$t_{3'}$, $t_{4'}$]=[$t_1$−a, $t_1$−$t_p$] ($t_1$−a may also be $t_2$−a, or $t_4$−a), where a is a (pre)configured or (pre)defined value, and alternatively, a is positive infinity. The effect of this method is that resource positions after slot $t_1$−$t_p$ are excluded in the original sensing window [$t_3$, $t_4$], so that the UE has sufficient processing delay for processing the sensing result. The method may also be simplified as follows: after the UE takes the sensing windows corresponding to all slots included in the transmission window [$t_1$, $t_2$] as the final sensing window, and a part of resources are excluded in the final sensing window, which includes excluding the resource positions after slots $t_1$−$t_p$.

In another specific example, the UE expects to transmit the sidelink transmission within the transmission window [$t_1$, $t_2$], determines the sensing window [$t_3$, $t_4$] according to [$t_1$, $t_2$], and selects the resources for transmission in slot to, where $t_1$, $t_2$, $t_3$ and $t_4$ are indexes of slots. In this example, $t_3$<$t_4$<$t_0$<$t_1$<$t_2$. In this example, since the UE is to select resources for transmission in slot $t_0$, there needs to be a sufficient interval between the end position of the sensing window determined by the UE and slot to, which is used for the UE to process the sensed information and determine the resources used for the sidelink transmission based on the sensing result. This limitation can be understood as that the UE determines a sensing window (for convenience of description, referred to as "first sensing window" in this example), and its start position can be the minimum/maximum of any one or more of the following: t-a (where a is a predetermined/(pre)configured offset), negative infinity, or its start position limited by the UE's buffering capacity (for example, if the UE buffers the reception of X slots at most, then the start position of the sensing window is t-X); its end position corresponds to the processing delay of the above processing of sensing information and determination of resources, i.e., t-$T_{proc,0}$, where $T_{proc,0}$ is the processing delay, and its value can be determined or predetermined based on UE capability; wherein t may be at least one resource in $t_0$, $t_1$, $t_2$, or [$t_1$, $t_2$]. In this example, a plurality of sidelink resource positions may be indicated in the sidelink control information SCI, which are distributed in a time window with a length of $p_m$ ($p_m$=32 in Release 16) slots in the resource pool and are regarded as reserved for possible future transmission by the UE transmitting the SCI, therefore, in order to avoid conflicts with resources reserved by other UEs in the SCI, the UE needs to sense any SCI that may reserve resources in transmission window [$t_1$, $t_2$]. Accordingly, the UE determines a sensing window [t'−$p_m$, t'−$T_{proc,X}$] (for convenience of description, referred to as "second sensing window" in this example), where $T_{proc,X}$ is the delay for the UE to process the sensing result and start the resource selection process, or $T_{proc,X}$ is a predetermined offset (e.g., 1 or 0); t' may be at least one resource or each resource in $t_0$, $t_1$, $t_2$, or [$t_1$, $t_2$]. When [$t_1$, $t_2$] is continuous in time domain, the second sensing window may be [$t_1$−$p_m$, $t_2$−$T_{proc,X}$] because there is partial overlap between the sensing windows [t'−$p_m$, t'−$T_{proc,X}$] determined based on each resource in [$t_1$, $t_2$]; when [$t_1$, $t_2$] is discontinuous in time domain, the sensing window [t'−$p_m$, t'−$T_{proc,X}$] determined based on each resource in [$t_1$, $t_2$] may partially overlap or not overlap, and the second sensing window may be an intersection of the sensing window [t'−$p_m$, t'−$T_{proc,X}$] determined based on each resource in [$t_1$, $t_2$]. In this example, the UE takes the intersection of the first sensing window and the second sensing window as the final sensing window. With [$t_1$, $t_2$] being continuous in time domain and the first sensing window being [negative infinity, $t_0$−$T_{proc,0}$] as an example, the final sensing window is an intersection of [$t_1$−$p_m$, $t_2$−$T_{proc,X}$] and [negative infinity, $t_0$−$T_{proc,0}$], i.e., [$t_1$−$p_m$, min($t_0$−$T_{proc,X}$, $t_2$−$T_{proc,X}$)] (note: generally, $T_{proc,0}$) and $T_{proc,X}$ are two relatively small values, and considering the timing relationship between $t_0$ and $t_2$, the result usually calculated here is $t_0$−$T_{proc,0}$), where the function min(num1, num2) represents the minimum value of num1 and num2. Further, considering that the timing relationship between to and $t_1$ may be larger than $p_m$ slots (for example, when the remaining PDB of the service is large enough), $t_1$−$p_m$<$t_0$, that is, the first sensing window and the second sensing window do not actually intersect. A specific example is that the UE is triggered to select resources in subframe n, the remaining PDB is 100 slots, and the UE selects [n+50, n+60] as the transmission window; since the reserved resources in the SCI span 32 slots at most, the second sensing window corresponding to this transmission window is [n+19, n+29]; the first sensing window is [negative infinity, n−1] based on the UE capability and predetermined parameters. In this case, one method is that the final sensing window can be further determined as [min($t_0$−$T_{proc,0}$, $t_1$−$p_m$), min($t_0$−$T_{proc,0}$, $t_2$−$T_{proc,X}$)], and if the determined start position and end position of the final sensing window are the same, the UE does not perform sensing on the final sensing window.

Accordingly, in the above specific example, if the final sensing window determined by the UE is [n−1, n−1], the UE does not perform sensing on the final sensing window. In another method, the final sensing window is still $[t_1-p_m, \min(t_0-T_{proc,0}, t_2-T_{proc,x})]$, and if $t_1-p_m>\min(t_0-T_{proc,0}, t_2-T_{proc,x})$, the UE does not perform sensing on the final sensing window. Accordingly, in the above specific example, the final sensing window determined by the UE is [n+19, n−1], and since n+19>n−1, the UE does not perform sensing on this final sensing window. In this embodiment, the transmission window may correspond to the transmission window [n+T1, n+T2] in the current sensing process (if the UE is triggered to select resources in slot n), and may also correspond to the time domain positions of candidate resources (for example, Y candidate resources selected by the UE in [n+T1, n+T2] based on its own slot in the current technology) in the transmission window selected by the UE in the current sensing process.

The advantage of this method is that, at least for the resource reservation in the same period, when the system supports indicating the resources spanning up to $p_m$ slots in the SCI, for any candidate resource that may be used for the sidelink transmission, it is only necessary to monitor the SCI in up to $p_m$ slots before to acquire sufficient intra-period resource reservation information, and more monitoring is inefficient from the perspective of energy utilization. Therefore, by limiting an appropriate value of $p_m$ and selecting the start position of the transmission window as an offset reference point, the number of slots used for monitoring can be reduced as much as possible, and sufficient intra-period resource reservation information can still be collected effectively. The mechanism is especially suitable to be used in combination with periodic sensing windows (for example, the periodic sensing windows determined based on $t=t_0-N*p-N'*p'$ in other embodiments above), and the sensing windows in the mechanism are used to avoid interference caused by intra-period reserved resources of other UEs, and the periodic sensing windows are used to avoid interference caused by inter-period reserved resources of other UEs.

The actual transmission window (e.g., [n+T1, n+T2]) or the selected candidate resources, instead of the time point (to) when the UE is triggered to select resources, is used as the offset reference point, which can further reduce the number of slots used for monitoring and still effectively collect sufficient intra-period resource reservation information. This is because the resources between the time point $(t_0)$ when the UE is triggered to select resources and the start position $(t_1)$ of the transmission window will not be used for the sidelink transmission, and among the first several resources in the second transmission window $[t_0-p_m, t_0-T_{prox,x}]$ with to as the reference point, the latest time domain positions of potential intra-period resource reservation of other UEs are also before $t_1$, so monitoring in the first several resources is actually meaningless.

In the above implementations, the UE can expect a time point or time range at which a sidelink transmission is to be performed and determine the sensing window according to the transmission window. In some other implementations, the UE can determine the time point or time range of the sensing window, and determine the transmission window according to the sensing window by adopting the method corresponding to the above implementations.

For example, the UE determines the sensing window $[t_3, t_4]$ according to (pre)configured or (pre)defined information; determines, according to the method in the above implementation, $t=t_0-a$, and determines $t_0=t+a$ accordingly; wherein corresponding to the above implementations, t may be $t_3$ and/or $t_4$, and to includes at least one of: $t_0=t_1$, $t_0=t_2$, and to being an index of each and/or at least one time unit within the time range $[t_1, t_2]$.

The other methods mentioned above in the implementations for determining the sensing window according to the transmission window may also be similarly used in the implementations for determining the transmission window according to the sensing window, and will not be described one by one.

Referring again to FIG. 5, after determining the sensing window $[t_3, t_4]$, at step S520, channel sensing is performed in the sensing window.

In addition, after the channel sensing is performed, at step S530, a sidelink resource for transmitting a sidelink transmission is determined in the transmission window according to a result of the channel sensing.

In some implementations, after determining the sensing window $[t_3, t_4]$, the method for the UE to select specific sidelink resources for transmitting the sidelink transmission within $[t_1, t_2]$ according to the result of the channel sensing within $[t_3, t_4]$ includes excluding, by the UE, reserved resources within $[t_1, t_2]$, which include sidelink resources indicated in SCI received by the UE in $[t_3, t_4]$. This method is similar to the existing channel sensing technology and will not be described in detail.

In an embodiment, a method for determining a sensing window and determining a sidelink resource according to various embodiments of the disclosure is specifically described.

In this embodiment, a UE may serve as a transmitter of sidelink data, and may or may not be able to expect a time point or time range at which the sidelink transmission will be performed. This embodiment is applicable to data services that arrive periodically and burst in sidelink data services.

In some implementations, the UE determines a time range $[t_3, t_4]$ for channel sensing, and performs channel sensing within the time range $[t_3, t_4]$, and selects specific sidelink resources for transmitting sidelink transmissions according to the result of the channel sensing. Alternatively, if the UE expects that the sidelink transmission is to be transmitted within a specific time range $[t_1, t_2]$, it determines a time range $[t_3, t_4]$ for channel sensing according to $[t_1, t_2]$, and performs channel sensing within the time range $[t_3, t_4]$, and selects specific sidelink resources for transmitting the sidelink transmission within $[t_1, t_2]$ according to the result of the channel sensing. In this embodiment, for convenience of description, the time range in which the sidelink transmission is expected to be transmitted is referred to as a transmission window, and the time range for channel sensing is referred to as a sensing window.

Wherein $t_2$ may be greater than or equal to $t_1$, and $t_4$ may be greater than or equal to $t_3$; $t_1$, $t_2$, $t_3$ and $t_4$ may be indexes of slots, OFDM symbols, subframes or other time units. $[t_3, t_4]$ may include one or more sets of values, and for example, as shown in FIG. 4, $[t_3, t_4]$ includes a total of X sets of values including $[t_{3\_1}, t_{4\_1}]$, $[_{3\_2}, t_{4\_2}]$, . . . , and $[t_{3\_X}, t_{4\_X}]$.

In addition, the sidelink transmission expected to be transmitted may include at least one of a PSCCH, a PSSCH, and a PSFCH.

The method for determining the sensing window $[t_3, t_4]$ includes at least one of:

determining $[t_3, t_4]$ according to (pre)configured or (pre) defined information, and/or information obtained in SCI, and/or information obtained in a sidelink grant; wherein the above information includes at least one of: a time offset parameter for determining the sensing window, a period parameter for determining the sensing window, an index for determining the sensing window, a UE identity, geographic location information, $t_1$ and $t_2$;

determining $[t_3, t_4]$, determining a time range for performing sensing according to $[t_1, t_2]$, and using $[t_3, t_4]$ within the time range as the sensing window; wherein $[t_3, t_4]$ includes periodic $[t_3, t_4]$; for example, according to $[t_1, t_2]$, a time range for performing sensing is determined as $[t_1-a, t_2-b]$, and periodic (and/or aperiodic) $[t_3, t_4]$ within the range of $[t_1-a, t_2-b]$ is used as the sensing window; further, if there are multiple $[t_3, t_4]$ in the time range for performing sensing, the latest $[t_3, t_4]$, or the latest N $[t_3, t_4]$, or all $[t_3, t_4]$ are selected as the sensing window. In some implementations, after determining the sensing window $[t_3, t_4]$, the method for the UE to select the specific sidelink resources for transmitting the sidelink transmission according to the result of the channel sensing includes at least one of:

excluding reserved resources within $[t_1, t_2]$, which include sidelink resources indicated in SCI received by the UE in $[t_3, t_4]$; wherein the sidelink resources indicated in the SCI include resources reserved by a transmitter UE of the SCI for its subsequent transmission.

excluding reserved resources within $[t_1, t_2]$, which include sidelink resources indicated in SCI and/or a higher layer signaling received by the UE in $[t_3, t_4]$; wherein the sidelink resources indicated in the SCI and/or higher layer signaling include resources determined by a transmitter UE of the SCI and/or higher layer signaling that have been reserved by itself and/or other sidelink UEs;

retaining specific resources within $[t_1, t_2]$, and/or excluding other resources except for the specific resources within $[t_1, t_2]$, where the specific resources include sidelink resources indicated in SCI and/or a higher layer signaling received by the UE in $[t_3, t_4]$; wherein the sidelink resources indicated in the SCI and/or higher layer signaling include resources determined by a transmitter UE of the SCI and/or higher layer signaling that may be used by other UEs (including any UEs supporting sidelink communication or specific UEs);

using sensing results of other UEs received within $[t_3, t_4]$ or on other resources as its own sensing result;

using sidelink resources scheduled by other UEs for the UE which are received within $[t_3, t_4]$ or on other resources as the specific sidelink resources for transmitting the sidelink transmission;

selecting the specific sidelink resources for transmitting the sidelink transmission from remaining sidelink resources within $[t_1, t_2]$.

In the above implementations, the resources determined by the transmitter UE of the SCI and/or higher layer signaling that have been reserved by itself and/or other sidelink UEs may be determined by the transmitter UE according to its sensing result; accordingly, the received information may be used as the sensing results of other UEs. The sensing results may be indicated in the form of a bitmap, and each bit in the bitmap corresponds to a sidelink resource.

After determining the sensing window $[t_3, t_4]$, the method for the UE to select the specific sidelink resources for transmitting the sidelink transmission according to the result of the channel sensing further includes at least one of:

for the sidelink resources indicated in the SCI received in $[t_3, t_4]$, if the resources are resources reserved by the transmitter UE of the SCI for its subsequent transmission but then for which the reservation is cancelled, not excluding the resources for which the reservation is cancelled.

for sidelink resources indicated in the SCI received in $[t_3, t_4]$, if the resources are resources that may be used by other UEs in the above embodiments but then reserved by other UEs, excluding the resources reserved by other UEs within $[t_1, t_2]$ or not retaining the resources reserved by other UEs within $[t_1, t_2]$. This method may be used in combination with other methods mentioned above.

After determining the sensing window $[t_3, t_4]$, the method for the UE to select the specific sidelink resources for transmitting the sidelink transmission according to the result of the channel sensing also includes: based on measurement results in $[t_3, t_4]$, excluding reserved resources within $[t_1, t_2]$ and/or retaining specific resources within $[t_1, t_2]$ and/or excluding other resources except for specific resources within $[t_1, t_2]$. The measurement in $[t_3, t_4]$ includes energy detection and/or measurement of specific signals/channels, such as RSRP measurement, RSRQ measurement, CSI-RS measurement and RSSI measurement. The method of excluding/retaining resources within [t1, t2] based on the measurement results in $[t_3, t_4]$ includes excluding resources in [t1, t2], which correspond to resources in [t3, t4] satisfying preset conditions, based on the measurement results on specific or arbitrary resources in $[t_3, t_4]$ and a mapping relationship between resources in $[t_3, t_4]$ and resources in [t1, t2]. The preset conditions include the measurement results satisfying a specific threshold range, such as exceeding a threshold. This method can be used in combination with other methods mentioned above.

In some implementations, the UE receives, in $[t_3, t_4]$, the sidelink resources indicated in SCI and/or a higher layer signaling, and/or the sensing results of other UEs, and/or the sidelink resources scheduled by other UEs for the UE; and determines a type of the sidelink resources, and/or determines that the indicated information is the sensing results of other UEs, and/or determines that the indicated information is the sidelink resources scheduled by other UEs for the UE.

The type of the sidelink resources include the sidelink resources being reserved resources or specific resources in the above implementations, and/or the sidelink resources being resources reserved by the transmitter UE of the SCI for a subsequent transmission, resources determined by the transmitter UE of the SCI and/or higher layer signaling that have been reserved by itself and/or other sidelink UEs, or resources determined by the transmitter UE of the SCI and/or higher layer signaling that may be used by other UEs.

Further, the UE determines the type of the sidelink resources, and/or determines that the indicated information is the sensing results of other UEs, and/or determines that the indicated information is the sidelink resources scheduled by other UEs for the UE, according to at least one of the following ways:

determining according to whether the signaling is a specific signaling; further, the specific signaling includes a specific signaling format, such as a specific SCI format; for example, in sidelink communication systems, at least one of the following is indicated through a specific SCI format or higher layer signaling (such as a specific MAC CE, or a RRC IE): resources reserved by the transmitter UE that transmits the SCI/higher layer signaling and/or other sidelink UEs, resources that may be used by other UEs, sensing results of the transmitter UE of the SCI/higher layer signaling, and sidelink resources scheduled by the transmitter UE of the SCI/ high layer signaling for other sidelink UEs, and the UE determines whether sidelink resources indicated in the signaling are at least one of the above by determining whether the signaling is the specific SCI format/higher layer signaling;

determining according to resources in which the signaling is received; for example, the UE is configured to receive, at a specific resource location, sensing results of other UEs or sidelink resources scheduled by other UEs for the UE, the UE understands information indicated in signaling received at the specific resource location as the sensing results of other UEs or sidelink resources scheduled by other UEs for the UE, and understands information indicated in signaling received at other resource locations as other uses, for example, understands sidelink resources indicated in the SCI received at other resource locations as resources reserved by the transmitter UE of the SCI for its subsequent transmission;

determining according to an identity of the transmitter UE of the signaling; for example, the UE determines a set of UE IDs according to (pre)configured or (pre)defined information, and the set corresponds to the sensing results of other UEs or the sidelink resources scheduled by other UEs for the UE; accordingly, if a source ID or other IDs (e.g., UE ID, UE group ID, and UE intra-group ID) of the transmitter UE of the signaling is within the set of UE IDs, it is considered that the signaling indicates the sensing results of other UEs or the sidelink resources scheduled by other UEs for the UE, otherwise, it is considered that the signaling indicates other information, for example, when the signaling is SCI, it is considered that it indicates resources reserved by the transmitter UE of the SCI for its subsequent transmission;

determining according to specific other parameters, the other parameters including at least one of: a RNTI, a type of sidelink resources explicitly indicated by a specific domain in SCI/higher layer signaling, and a type of sidelink resources implicitly indicated in SCI/higher layer signaling.

In the above implementations, by determining the channel sensing range which is periodic, the power consumption of the UE monitoring the sidelink may be reduced, and the sidelink resources may be determined more completely and the accuracy of determining the sidelink resources may be improved by performing channel sensing or determining transmission resources based on the obtained assistance information of other UEs.

In some implementations, alternatively, the method for the UE to select the specific sidelink resources for transmitting the sidelink transmission according to the result of the channel sensing further includes: after receiving sidelink resources indicated in SCI and/or a higher layer signaling, determining validity of the indication, and if the indication is valid, selecting the specific sidelink resources for transmitting the sidelink transmission according to the indication; otherwise, if the indication is invalid, not selecting the specific sidelink resources for transmitting the sidelink transmission according to the indication. The determining of the validity of the indication may be used not only in the above implementations and embodiments, but also in any method (e.g., legacy channel sensing process) in which UE selects the specific sidelink resources for transmitting the sidelink transmission according to the result of the channel sensing; in addition, it may also be used in a method of selecting specific sidelink resources for transmitting a sidelink transmission without the result of the channel sensing, directly or based on other ways (for example, a method of randomly selecting sidelink resources in a LTE V2X system).

In some implementations, in the method for the UE to select the specific sidelink resources for transmitting the sidelink transmission according to the result of the channel sensing, if sidelink resources indicated in SCI/higher layer signaling from more than one UE are received, and/or if more than one sidelink transmission is received and the sidelink transmission indicates resources determined by the transmitter UE of the sidelink transmission that have been reserved by itself and/or other sidelink UEs, and/or resources determined by the transmitter UE of the sidelink transmission that may be used by other UEs, alternatively, it also includes at least one of:

selecting the specific sidelink resources for transmitting the sidelink transmission based on all information indicated in SCI/higher layer signaling from the more than one UE and/or the more than one transmission; for example, if sidelink resources indicated in SCI/higher layer signaling from N UEs are received, and the sidelink resources include resources determined by the transmitter UE of the SCI/higher layer signaling that have been reserved by itself and/or other sidelink UEs, the sidelink resources indicated in the SCI/higher layer signaling from the N UEs are excluded; for example, if N sidelink transmissions are received, and resources determined by the transmitter UE of the sidelink transmissions that may be used by other UEs are indicated in the sidelink transmissions, the resources indicated in the N sidelink transmissions are retained or other resources except for the resources indicated in the N sidelink transmissions are excluded;

selecting SCI/higher layer signaling from specific one or N UEs among the more than one UE, and/or selecting specific one or N transmissions among more than one transmission, and selecting the specific sidelink resources for transmitting the sidelink transmission according to information indicated in the specific one or N UEs/transmissions.

Wherein determining the validity of the indication, and/or selecting the SCI/higher layer signaling from the specific one or N UEs among the more than one UE, and/or selecting the one or N transmissions among the more than one transmission includes selecting/determining according to at least one of: geographic location information, a UE group identity/a UE intra-group identity, a transmission time (including a transmission time of SCI and/or a higher layer signaling, and a time of transmitting sidelink transmissions and/or a time corresponding to a transmission window), and content indicated (in SCI/higher layer signaling or a transmission). For example, the distance from a UE transmitting the indication is determined according to the geographic location information, and the indication is considered invalid when the distance exceeds a threshold; or one or N UEs with the closest geographic distance are selected. For example, when an identity of a UE does not belong to a specific range, the indication of the UE is considered invalid; or, one or N UEs with the highest priority corresponding to the identity are selected; wherein the priority corresponding to the identity may be (pre)configured/defined. For example, when the indicated transmission time is earlier than a specific offset, the indication is considered invalid; or, one or N transmissions with the latest transmission time are selected. For example, priorities are (pre)configured for different types of indicated content, and the indicated content with the highest priority is selected.

With respect to the methods for determining the sensing window [$t_3$, $t_4$] in the above embodiments and implementations, the UE may select a method for determining the sensing window [$t_3$, $t_4$] according to at least one of:

determining according to a configuration; for example, when a method is (pre)configured to be enabled, it is used, otherwise it is not used when the method is (pre)configured to be disabled. Similarly, it may also be determined according to a (pre)defined method. Determining according to a configuration/definition further includes, if an association relationship between one or more methods and other parameters is (pre)configured or (pre)defined, determining a method used according to the other parameters and the association relationship. The other parameters include at least one of: a service type, a UE identity/a UE group identity/a UE intra-group identity, a destination ID of a sidelink transmission, a delay requirement or Packet Delay Budget (PDB) of a sidelink transmission, geographic location related information (e.g., a zone ID), a logical channel identifier (LCID), a cast type (e.g., unicast/multicast type 1/multicast type 2/broadcast), and a service priority (e.g., priority indicated by QoS or a priority field in a physical layer signaling). The configuration may be resource pool-specific, cell-specific, UE-specific and other parameters-specific;

determining according to a UE capability; for example, when the UE capability can support a certain method, this method is used; otherwise, when the UE capability cannot support the certain method, this method is not used;

determining according to priorities between different methods; for example, if multiple methods may be used, the N methods with the highest priority are used; it also includes, if multiple non-mutually exclusive methods may be used, using the multiple non-mutually exclusive methods in combination; otherwise, methods with the highest priority among the mutually exclusive methods are selected.

Similarly, the UE may also determine a method for selecting the specific sidelink resources for transmitting the sidelink transmission according to at least one of the above.

In an embodiment, determining the sensing window [$t_3$, $t_4$] by the UE further includes using a method for determining the sensing window in the prior art by the UE when any of the above methods for determining the sensing window [$t_3$, $t_4$] cannot be used. This implementation may be understood as a fallback to a legacy sensing process when the UE cannot enable a feature of partial sensing.

The above method will be described in detail with specific examples below.

In the above method, for determining [$t_3$, $t_4$] according to (pre)configured or (pre)defined information, a specific example is as follows: [$t_3$, $t_4$]=[K mod P+a, K mod P+b], where K may be at least one of an index for determining a sensing window, a UE identity, a UE group identity, a UE intra-group identity, geographic location information, $t_1$, and $t_2$ or low-order bits of at least one of them (e.g., the low-order 4 bits of zone ID), and P may be a period parameter for determining the sensing window, and a and b may be time offset parameters for determining the sensing window. In this example, the advantage of defining K as geographic location information is that, from the point of view of device cost and deployment difficulty, Roadside Units (RSUs) may be configured in different geographic areas in a V2X communication system, and RSUs may be configured to periodically transmit information indicating a result of channel sensing or available sidelink resources; in order to avoid a conflict of information transmitted by the RSUs in different geographic areas, according to geographic areas, different sidelink resources may be determined for different RSUs to transmit the above information; therefore, the UE correspondingly determines to monitor sidelink resources of the above information transmitted by the RSUs according to the geographic location information.

Another specific example is as follows: [$t_3$, $t_4$] includes values that satisfy the following conditions: ($t_3$+a) mod P=0, and/or ($t_4$+b) mod P=0, where P may be a period parameter for determining the sensing window, and a and b may be time offset parameters for determining the sensing window.

In the above method, with respect to sidelink resources indicated in SCI including resources reserved by the transmitter UE of the SCI for its subsequent transmission, a specific example is as follows: in a V2X communication system of Release 16, the UE may indicate two or three sidelink resources in SCI when transmitting the SCI, one of which is used for transmitting PSSCH associated with the SCI, and the other one or two sidelink resources are reserved by the UE for a subsequent transmission.

In the above method, with respect to sidelink resources indicated in SCI including resources determined by the transmitter UE of the SCI that have been reserved by itself and/or other sidelink UEs, a specific example is as follows: the transmitter UE of the SCI determines that sidelink resource #a (#a may include an index of at least one of a time-domain position, a frequency-domain position and a code-domain position) is reserved by itself, sidelink resources #b and #c are reserved by other sidelink UEs and other sidelink resources are available; then the transmitter UE of the SCI indicates sidelink resources #a, #b and #c in the SCI. Further, when the sidelink resources indicated in the SCI include resources determined by the transmitter UE of the SCI that have been reserved by itself and/or other sidelink UEs, the SCI is SCI dedicated to indicating a result of channel sensing, and for example, the SCI indicates that the SCI is dedicated to indicating the result of the channel sensing by an explicit domain, or the SCI implicitly indicates that the SCI is dedicated to indicating the result of the channel sensing by means of a specific time-frequency location, a specific destination ID and the like. Further, the sidelink resources indicated in the SCI include: determining, by the transmitter UE of the SCI, a specific time window, and determining, within the specific time window, resources reserved by itself and/or other sidelink UEs according to the result of the channel sensing. The method for determining the specific time window by the transmitter UE of the SCI includes any of the above methods for determining the sensing window [$t_3$, $t_4$], but parameters used may be independent or related to parameters used for determining the sensing window.

In the above method, with respect to sidelink resources indicated in SCI including resources determined by the transmitter UE of the SCI that may be used by other UEs, a specific example is as follows: the transmitter UE of the SCI determines, in a channel sensing process, that several sidelink resources are not reserved by other sidelink UEs, and selects sidelink resource #a (#a may include an index of at least one of a time-domain position, a frequency-domain position and a code-domain position), sidelink resources #b and #c as resources that may be used by other UEs; the transmitter UE of the SCI indicates sidelink resources #a, #b and #c in the SCI. Further, when the sidelink resources indicated in the SCI include resources determined by the transmitter UE of the SCI that may be used by other UEs, the SCI is SCI dedicated to indicating a result of channel sensing or available sidelink resources, and for example, the SCI indicates that the SCI is dedicated to indicating the result of the channel sensings or the available sidelink resources by an explicit domain, or the SCI implicitly indicates that the SCI is dedicated to indicating the result of the channel sensing or the available sidelink resources by means of a specific time-frequency location, a specific destination ID and the like. Further, the sidelink resources indicated in the SCI include: determining, by the transmitter UE of the SCI, a specific time window, and determining, within the specific time window, resources that may be used by other UEs according to the result of the channel sensing. The method for determining the specific time window by the transmitter UE of the SCI includes any of the above methods for determining the sensing window $[t_3, t_4]$, but parameters used may be independent or related to parameters used for determining the sensing window.

In the above method, with respect to sidelink resources indicated in a higher layer signaling including resources determined by the transmitter UE of the higher layer signaling that have been reserved by itself and/or other sidelink UEs, and/or including resources determined by the transmitter UE of the higher layer signaling that may be used by other UEs, a specific example thereof is similar to the above example of indicating in the SCI. The higher layer signaling includes a MAC signaling and/or an RRC signaling. Further, the higher layer signaling includes at least one of a MAC CE, a MAC header/sub header, and an RRC IE.

In the above method, when sidelink resources indicated in SCI/higher layer signaling include resources determined by the transmitter UE of the SCI/higher layer signaling that have been reserved by itself and/or other sidelink UEs, and/or including resources determined by the transmitter UE of the higher layer signaling that may be used by other UEs, alternatively, the resources are determined by the transmitter UE according to a result of channel sensing.

According to various embodiments of the disclosure, a specific example of the UE determining the sensing window and determining the sidelink resources is as follows: the UE expects that the sidelink transmission is to be transmitted within the transmission window $[t_1, t_2]$, and determines the sensing window $[t_3, t_4]$ according to $[t_1, t_2]$. $t_1, t_2, t_3$ and $t$ are indexes of slots.

The UE determines that $[t_3, t_4]$ includes values that satisfy the following conditions: $(t_3+a)$ mod $P=0$, and/or $(t_4+b)$ mod $P=0$, where $P=100$ (ms) is a period parameter for determining the sensing window, and $a=0$ and $b=-20$ are time offset parameters for determining the sensing window. Therefore, periodic $[t_3, t_4]$ determined by the UE includes: $[0,20]$, $[100,120]$, $[200, 220]$ . . . .

According to $[t_1, t_2]=[150,155]$, the UE determines that a time range for performing sensing is $[t_1-a, t_2-b]=[100,149]$, and uses periodic $[t_3, t_4]$ within the range of $[t_1-a, t_2-b]$ as the sensing window; therefore, a final sensing window $[t_3, t_4]$ determined by the UE is $[100,120]$.

After determining the sensing window $[t_3, t_4]$, the UE selects the specific sidelink resources for transmitting the sidelink transmission within $[t_1, t_2]$ according to a result of channel sensing within $[t_3, t_4]$, including:

the UE receiving sidelink resources #A1 and #A2 indicated in SCI from UE-A in $[t_3, t_4]$; the SCI is a SCI format of Release 16, and then the UE considers that sidelink resources #A1 and #A2 indicated in the SCI are reserved by UE-A for its subsequent transmission, and excludes #A1 and #A2 within $[t_1, t_2]$;

the UE receiving sidelink resources #B1, #B2 and #B3 indicated in SCI from UE-B in $[t_3, t_4]$; the SCI explicitly indicates that the SCI is used to instruct UE-B to determine resources that may be used by other UEs according to a result of channel sensing, and then the UE retains #B1, #B2 and #B3 within $[t_1, t_2]$, or the UE excludes other resources except for #B1, #B2 and #B3 within $[t_1, t_2]$;

the UE receiving sidelink resources #C1, #C2, . . . , and #C6 indicated in a MAC CE from UE-C in $[t_3, t_4]$; the MAC CE is dedicated to indicating resources determined by UE-C according to a result of channel sensing that have been reserved by itself and/or other sidelink UEs, and then the UE excludes #C1, #C2, . . . , and #C6 within $[t_1, t_2]$;

the UE reporting remaining sidelink resources within $[t_1, t_2]$ to a higher layer, and the higher layer selects specific sidelink resources for transmitting a sidelink transmission randomly or based on a specific criterion, and transmits the selected specific sidelink resources to the physical layer.

In some implementations, the UE is triggered to select resources for the sidelink transmission (e.g., PSSCH transmission) in slot n, and the UE determines to perform sensing after slot n.

The conditions for the UE to determine to perform sensing after slot n include a condition that the priority corresponding to the sidelink transmission satisfies a specific threshold range, and a condition that the delay requirement corresponding to the sidelink transmission satisfies a specific threshold range. Optionally, the conditions also include a condition that the UE cannot expect when the resource selection corresponding to the sidelink transmission will be triggered before slot n (for example, the higher layer did not indicate the resource reservation interval $P_{rsvp\_TX}$ when indicating the resource selection process related parameters of other TBs or the indicated $P_{rsvp\_TX}=0$, or any $P_{rsvp\_TX}$ indicated by the higher layer cannot deduce the triggered resource selection in slot n). In this implementation, the delay requirement is expressed by the remaining PDB parameters indicated by the higher layer, but it can also be similarly replaced by other delay-related parameters.

In this implementation, assuming that the remaining PDB is $T_{PDB}$, the UE determines the transmission window $[n+t_1, n+t_2]$ and the sensing window $[n+t_3, n+t_4]$, and $t_1$ is less than $t_2$ and $t_2$ is less than or equal to $T_{PDB}$. Optionally, the UE determines the transmission window $[n+t_1, n+t_2]$, and then determines the sensing window $[n+t_3, n+t_4]$ according to the mapping relationship or timing restriction between the transmission window and the sensing window accordingly; or the UE determines the sensing window $[n+t_3, n+t_4]$ and then determines the transmission window $[n+t_1, n+t_2]$ according to the mapping relationship or timing restriction between the transmission window and the sensing window accordingly; or the UE separately determines the transmission window $[n+t_1, n+t_2]$ and the sensing window $[n+t_3, n+t_4]$, and optionally also ensures that the positions of the transmission window and the sensing window satisfies a specific timing limit. The timing limit includes at least one of the following: $t''-t'$ satisfies a specific threshold range; $t_2-t_1$ satisfies a specific threshold range; $t_4-t_3$ satisfies a specific threshold range; the ratio of $t_2-t_1$ and remaining PDB $(t_2-t_1)/T_{PDB}$ satisfies a specific threshold range; the ratio of $t_4-t_3$ and remaining PDB $(t_4-t_3)/T_{PDB}$ satisfies a specific threshold range; $t_1>t_{PDB,0}$; $t_4<t_{PDB,0}$; $t_{proc,b}>t_3>t_{proc,a}$. $n+t''$ corresponds to the start point ($t''=t_1$) and/or the end point ($t''=t_2$) of the transmission window and/or the time domain position of candidate resources in any transmission window, and $n+t'$ corresponds to the start point ($t'=t_3$) and/or the end point ($t'=t_4$) of the sensing window and/or the time domain position of candidate resources in any sensing window. $t_{PDB,0}$ is a predetermined or (pre)configured value, or $t_{PDB,0}=T_{PDB}*x$, x is a predetermined or (pre)configured value, which can be used to indicate a scaling factor, and $t_{PDB,0}$ and/or x can be determined based on the priority; and/or $t_{PDB,0}$ is determined by the UE implementation. $t_{PDB,0}$ can also be replaced by $t_{decide}$, which is used to indicate the time point when the UE determines the resources used for the sidelink transmission, and its determination method is similar to $t_{PDB,0}$. $t_{proc,a}$ and $t_{proc,b}$ correspond to the processing delay for the UE to start sensing after the resource selection is triggered or the minimum/maximum value of the processing delay.

In a specific example, the UE determines that $t_2$ is less than or equal to $T_{PDB}$, and determines the maximum value of t based on $t_2-t_1$ exceeding a specific threshold value and determines [$n+t_1$, $n+t_2$] on this basis. Optionally, the UE determines [$n+t_1$, $n+t_2$] based on the current transmission being a first transmission/Nth transmission (or N−1th retransmission), where smaller current retransmission times correspond to smaller values of $t_1$ and $t_2$, so that there is still time for potential retransmission after the end of the transmission window. Because there needs to be a certain gap between the start position of the transmission window and the end position of the sensing window as the processing delay, the UE determines the maximum value of $t_4$ based on $t_1-t_4$ exceeding the threshold value of the corresponding processing delay, and/or determines the minimum value of $t_3$ based on $t_1-t_3$ not exceeding p, and determines [$n+t_3$, $n+t_4$] on this basis. $p_m$ corresponds to the maximum time domain span of multiple resources when the multiple resources are indicated in the SCI, for example, $p_m$ corresponding to the SCI in Release 16 is equal to 31.

In another specific example, for better delay performance, the UE hopes to start and end the sensing process as soon as possible and select the transmission resources as soon as possible, so it is determined that the start position of the sensing window satisfies $t_{proc,b}>t_3>t_{proc,a}$, and the start position of the transmission window is as early as possible on the premise of satisfying the delay limit. In order to avoid interference caused by resources reserved by other UEs in the SCI, UE considers that the sensing window needs to include no more than $p_m$ slots before corresponding to each resource in the transmission window. Because [$n+t_1$, $n+t_2$] is continuous and its corresponding sensing windows partially overlap, the UE considers that the start point of the sensing window is the first resource in the transmission window, or no more than $p_m$ slots before corresponding to the earliest resource in time domain of the selected candidate resources; Accordingly, the UE determines that the start position of the transmission window satisfies that $t_1-t_3$ does not exceed $p_m$, or $t_2-t_3$ does not exceed $p_m$. On this basis, the UE determines the sensing window [$n+t_3$, $n+t_4$] and the transmission window [$n+t_1$, $n+t_2$]. Optionally, the UE determines that the sensing window is [$n+t_3$, $n+t_3+p_m-t_{proc,c}$], where $t_{proc,b}>t_3>t_{proc,a}$, and $t_{proc,c}$ corresponds to the processing delay for the UE to process the sensing result and determine the transmission resources; the UE determines that the transmission window is [$n+t_3+p_m$, $n+t_2$] and the time domain length of the transmission window exceeds a specific threshold value. Optionally, the SCI in Release 16 can indicate the sidelink resources in up to 32 slots (including the current slot for transmitting the SCI), with $p_m=31$.

In another specific example, the UE determines $t_{decide}=T_{PDB}*x$, and optionally determines x based on the priority corresponding to the sidelink transmission. The UE determines that the transmission window [$n+t_1$, $n+t_2$] satisfies $t_1-t_{decide}>t_{proc,d}$, where $t_{proc,d}$ corresponds to the processing delay for the UE to process the sensing result and determine the transmission resources; the UE determines that the sensing window [$n+t_3$, $n+t_4$] satisfies that $n+t_3+p_m$ is less than or equal to $n+t_1$, and $t_{decide}-t_4>t_{proc,e}$, wherein $t_{proc,e}$ corresponds to the processing delay for the UE to end the sensing and determine the sensing result.

In some implementations, the UE performs uplink transmissions and downlink receptions based on scheduling of a base station, and also performs sidelink transmissions based on the scheduling of the base station. A signaling with which the base station schedules the UE for uplink transmissions, downlink receptions and sidelink transmissions includes downlink control information (DCI), and different UE transmissions/receptions may correspond to DCI with different formats. In order to reduce the overhead of detecting DCI, DCI size alignment technology is used in the prior art, so that the DCI size required for blind detection by a UE does not exceed a predetermined maximum value. However, this technology is only directed to a DCI format for scheduling uplink transmissions/downlink receptions, and fails to provide a size alignment method corresponding to a DCI format for scheduling sidelink transmissions.

Alternatively, the UE always aligns a size of the DCI format for scheduling sidelink transmissions to other DCI formats; or, if a total number of DCI sizes which the UE is configured to detect exceeds a preset value when the size alignment is not performed for the DCI format for scheduling sidelink transmissions, the size of the DCI format for scheduling sidelink transmissions is aligned to other DCI formats.

Alternatively, the method for the UE to align the size of the DCI format for scheduling sidelink transmissions to other DCI formats includes at least one of:

if the UE is configured with multiple DCI formats for scheduling sidelink transmissions, determining a maximum size corresponding to the multiple DCI formats for scheduling sidelink transmissions, and adding zero padding bits for the DCI formats for scheduling sidelink transmissions until the sizes of all DCI formats for scheduling sidelink transmissions are equal to the maximum size;

if the UE is configured with a specific DCI format (e.g., DCI format 0_1 or 1_1), and a number of information bits of a DCI format for scheduling sidelink transmissions monitored in a common search space (CSS) and/or UE-specific search space (USS) is smaller than the specific DCI format for scheduling the same serving cell monitored in the CSS and/or USS before padding, generating zero padding bits for the DCI format for scheduling sidelink transmissions until a size of the DCI format for scheduling sidelink transmissions is the same as the size of the specific DCI format;

If the UE is configured with a specific DCI format, and a number of information bits of a DCI format for scheduling sidelink transmissions monitored in a common search space (CSS) and/or UE-specific search space (USS) is larger than the specific DCI format for scheduling the same serving cell monitored in the CSS and/or USS before truncating, truncating specific bits in the DCI format for scheduling sidelink transmission until a size of the DCI format for scheduling sidelink transmissions is the same as a size of the specific DCI format;

if the UE is not configured with a specific DCI format, determining a DCI size with a smallest difference from a size of a DCI format for scheduling sidelink transmissions among other DCI sizes monitored in a common search space (CSS) and/or UE-specific search space (USS); if a number of information bits of the DCI format for scheduling sidelink transmission is smaller than the DCI size with the smallest difference before padding, generating zero padding bits for the DCI format for scheduling sidelink transmission until the size of the DCI format for scheduling sidelink transmissions is the same as the DCI size with the smallest difference;

if the UE is not configured with a specific DCI format, determining a DCI size with a smallest difference from a size of a DCI format for scheduling sidelink transmissions among other DCI sizes monitored in a common search space (CSS) and/or UE-specific search space (USS); if a number of information bits of the DCI format for scheduling sidelink transmissions is larger than the DCI size with the smallest difference before truncating, truncating specific bits in the DCI format for scheduling sidelink transmissions until the size of the DCI format for scheduling sidelink transmissions is the same as the DCI size with the smallest difference.

For the last two methods, alternatively, the methods are executed after completing the DCI alignment process in the prior art, so as to reduce the possibility of repeatedly aligning the length. For example, when the last two methods are used, they are added to the existing DCI alignment process as the last step.

In addition, the above embodiments or implementations described herein are not meant to be limiting. The aspects of the disclosure as generally described herein and shown in the drawings may be arranged, substituted, combined, separated and designed in various different configurations, all of which are contemplated herein. In addition, unless the context dictates otherwise, the features shown in each figure may be used in combination with each other. Therefore, the drawings should generally be regarded as an integral part of one or more general embodiments, but it should be understood that not all illustrated features are necessary for each embodiment.

Figure 6:
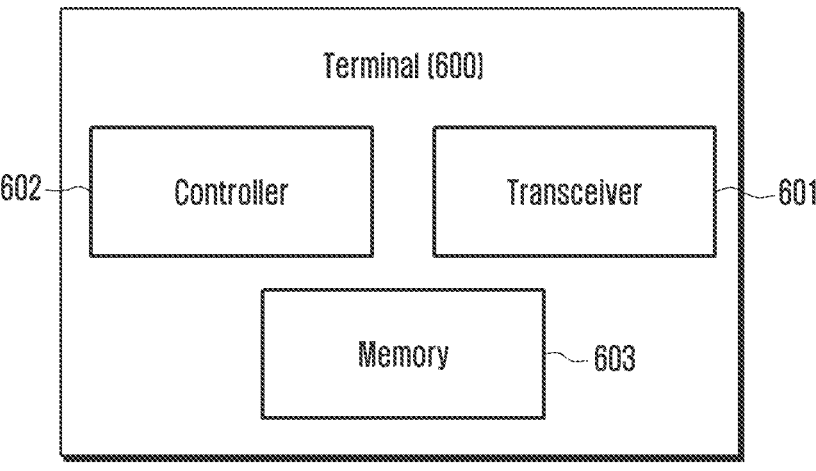
FIG. 6 illustrates a block diagram of a configuration of a terminal according to various embodiments of the disclosure.

FIG. 6 illustrates a block diagram of a configuration of a terminal according to various embodiments of the disclosure.

Referring to FIG. 6, a terminal 600 according to various embodiments of the disclosure may include a transceiver 601, a controller 602, and a memory 603. For example, the transceiver 601 may be configured to transmit and receive signals. For example, the controller 602 may be coupled to the transceiver 601. For example, the memory 603 may store instructions executable by the processor 602 that, when executed by the processor 602, cause the processor 602 to perform the aforementioned methods.

Although the terminal is illustrated as having separate functional blocks for convenience of explanation, the configuration of the terminal 600 is not limited thereto. For example, the terminal 600 may include a communication unit consisting of a transceiver and a processor. The terminal 600 may communicate with at least one network node by means of the communication unit.

Figure 7:
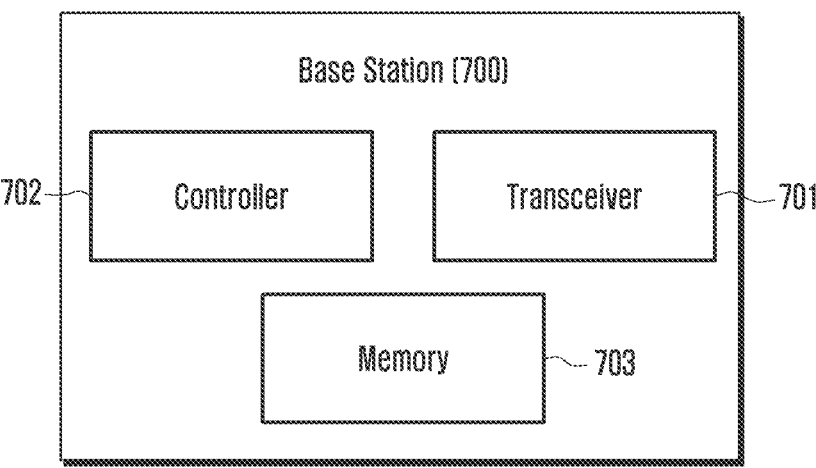
FIG. 7 illustrates a block diagram of a configuration of a base according to various embodiments of the disclosure.

FIG. 7 illustrates a block diagram of a configuration of a base station according to various embodiments of the disclosure.

Referring to FIG. 7, a base station 700 according to various embodiments of the disclosure may include a transceiver 701, a controller 702, and a memory 703. For example, the transceiver 701 may be configured to transmit and receive signals. For example, the controller 702 may be coupled to the transceiver 701. For example, the memory 703 may store instructions executable by the processor 702 that, when executed by the processor 702, cause the processor 702 to perform the aforementioned methods.

Although the base station is illustrated as having separate functional blocks for convenience of explanation, the configuration of the base station 700 is not limited thereto. For example, the base station 700 may include a communication unit consisting of a transceiver and a processor. The base station 700 may communicate with at least one network node by means of the communication unit.

At least part of the apparatus (e.g., modules or functions thereof) or the method (e.g., operations) according to various embodiments of the disclosure may be implemented by an instruction which is stored in a computer-readable storage medium (e.g., the memory) in a form of a program module. When executed by a processor or controller, the instruction may enable the processor or controller to perform corresponding functions. The computer-readable medium may include, for example, a hard disk, a floppy disk, a magnetic media, an optical recording media, a DVD, a magneto-optical media, and the like. The instructions may include a code made by a compiler or a code which can be executed by an interpreter. The module or apparatus according to various embodiments of the disclosure may include at least one or more of the aforementioned elements, some of the aforementioned elements may be omitted, or may further include other additional elements. Operations executed by the module, program module, or other elements according to various embodiments of the disclosure may be executed sequentially, in parallel, repeatedly, or in a heuristic manner. Alternatively, at least some operations may be executed in a different order or may be omitted, or other operations may be added.

What has been described above are only example embodiments of the present disclosure, and are not intended to limit the scope of protection of the present disclosure, which is determined by the appended claims.

The invention claimed is:

1. A method performed by a terminal for determining a sidelink resource, the method comprising:

determining a start position of a first sensing window based on a first offset value and a first slot of a transmission window;

determining an end position of the first sensing window based on a second offset value and the first slot of the transmission window;

determining a plurality of second sensing windows based on the first slot of the transmission window, a third offset value and a number of sensing occasions, wherein the plurality of second sensing windows are determined periodically;

performing channel sensing in the first sensing window determined based on the start position and the end position and in the plurality of second sensing windows; and determining, in the transmission window, a sidelink resource for transmitting a sidelink transmission according to a result of the channel sensing, wherein the transmission window is used for transmitting the sidelink transmission, and wherein each of the plurality of second sensing windows corresponds to a respective single-slot sensing window.

2. The method of claim 1, wherein the first offset value is a time domain offset value configured by a higher layer.

3. The method of claim 1, wherein in case that the first offset value is not configured, the first offset value indicating a number of slots is determined to be 31.

4. The method of claim 1, wherein the number of sensing occasions is determined by a higher layer parameter.

5. The method of claim 1, wherein the plurality of second sensing windows includes a last sensing occasion and a sensing occasion immediately before the last sensing occasion.

6. A terminal for determining a sidelink resource, the terminal comprising:

a transceiver; and a controller coupled with the transceiver and configured to:

determine a start position of a first sensing window based on a first offset value and a first slot of a transmission window, determine an end position of the first sensing window based on a second offset value and the first slot of the transmission window, determine a plurality of second sensing windows based on the first slot of the transmission window, a third offset value and a number of sensing occasions, wherein the plurality of second sensing windows are determined periodically, perform channel sensing in the first sensing window based on the start position and the end position and in the plurality of second sensing windows, and determine, in the transmission window, a sidelink resource for transmitting a sidelink transmission according to a result of the channel sensing, wherein the transmission window is used for transmitting the sidelink transmission, and wherein each of the plurality of second sensing windows corresponds to a respective single-slot sensing window.

7. The terminal of claim 6, wherein the first offset value is a time domain offset value configured by a higher layer.

8. The terminal of claim 6, wherein in case that the first offset value is not configured, the first offset value indicating a number of slots is determined to be 31.

9. The terminal of claim 6, wherein the number of sensing occasions is determined by a higher layer parameter.

10. The terminal of claim 6, wherein the plurality of second sensing windows includes a last sensing occasion and a sensing occasion immediately before the last sensing occasion.

* * * * *